(12) United States Patent
Murakami

(10) Patent No.: US 10,927,972 B2
(45) Date of Patent: Feb. 23, 2021

(54) FLOW RATE CONTROL VALVE

(71) Applicant: HITACHI AUTOMOTIVE SYSTEMS, LTD., Hitachinaka (JP)

(72) Inventor: Shingo Murakami, Ebina (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 22 days.

(21) Appl. No.: 15/555,278

(22) PCT Filed: Feb. 19, 2016

(86) PCT No.: PCT/JP2016/054795
§ 371 (c)(1),
(2) Date: Sep. 1, 2017

(87) PCT Pub. No.: WO2016/140079
PCT Pub. Date: Sep. 9, 2016

(65) Prior Publication Data
US 2018/0051815 A1    Feb. 22, 2018

(30) Foreign Application Priority Data
Mar. 3, 2015    (JP) .............................. JP2015-040866

(51) Int. Cl.
*F16K 11/076* (2006.01)
*F16K 25/00* (2006.01)
(Continued)

(52) U.S. Cl.
CPC ................ *F16K 25/00* (2013.01); *F01P 7/14* (2013.01); *F16K 11/076* (2013.01);
(Continued)

(58) Field of Classification Search
CPC .............. F01P 2007/146; F16K 11/076; F16K 11/0856; F16K 11/0873; F16K 25/00; F16K 3/262; Y10T 137/86549; Y10T 137/86566
See application file for complete search history.

(56) References Cited

U.S. PATENT DOCUMENTS 7,168,397 B2 * 1/2007 Chanfreau ......... B60H 1/00485
123/41.01
7,891,376 B2 * 2/2011 Neuhauser .............. F16K 1/443
137/312
(Continued)

FOREIGN PATENT DOCUMENTS

JP    H01-206169 A    8/1989
JP    H08-28725 A     2/1996
(Continued)

*Primary Examiner* — Seth W. MacKay-Smith
(74) *Attorney, Agent, or Firm* — Foley & Lardner LLP

(57) ABSTRACT

In a flow rate control valve CV provided with seal members S1 to S3 arranged radially between a housing 1 and a valve body 3 rotatably supported in the housing 1, seal members which hermetically seals the space radially between the housing 1 and valve body 3 by sliding against the outer peripheral surface of valve body 3, concave level difference parts N1 and N2 recessed lower than seal-sliding contact surfaces which are the outer peripheral surfaces of the seal-sliding parts D1 to D3 are provided, and parting lines P1 and P2 are provided within the level difference parts N1 and N2, and thereby it is possible to suppress damage to seal surfaces S1a to S3a of the seal members S1 to S3 caused by sliding against the parting lines P1 and P2 when the seal surfaces S1a to S3a pass through the parting lines P1 and P2.

14 Claims, 19 Drawing Sheets

(51) Int. Cl.
*F16K 11/085* (2006.01)
*F16K 31/00* (2006.01)
*F16K 31/04* (2006.01)
*F16K 11/087* (2006.01)
*F01P 7/14* (2006.01)

(52) U.S. Cl.
CPC ...... *F16K 11/0856* (2013.01); *F16K 11/0873* (2013.01); *F16K 25/005* (2013.01); *F16K 31/002* (2013.01); *F16K 31/043* (2013.01); *F01P 2007/146* (2013.01)

(56) References Cited

U.S. PATENT DOCUMENTS

| | | | |
|---|---|---|---|
| 8,596,302 B2* | 12/2013 | Fontenit | F16K 1/446 137/614.18 |
| 8,671,982 B2* | 3/2014 | Stoermer | F16K 11/0856 123/41.1 |
| 9,670,825 B2* | 6/2017 | Murakami | F16K 11/085 |
| 2015/0075658 A1 | 3/2015 | Tsuchiya et al. | |
| 2016/0003126 A1* | 1/2016 | Carns | F01P 7/14 123/41.44 |
| 2016/0010536 A1* | 1/2016 | Murakami | F16K 11/085 137/625.44 |
| 2017/0089482 A1* | 3/2017 | Dieterich | F16K 31/041 |

FOREIGN PATENT DOCUMENTS

| | | |
|---|---|---|
| JP | 2000-130610 A | 5/2000 |
| JP | 2013-249904 A | 12/2013 |

* cited by examiner

FLOW RATE CONTROL VALVE

TECHNICAL FIELD

The present invention relates to a flow rate control valve used for, for example, flow rate control of cooling water for a vehicle.

BACKGROUND TECHNOLOGY

As a related art flow rate control valve applied to flow rate control of cooling water for a vehicle, for example, a flow rate control valve described in the following Patent Document 1 is known.

This flow rate control valve is a so-called rotary type valve which performs flow rate control corresponding to the rotation position (phase) of a rotor that is a substantially cylindrical valve body, and has a structure in which the valve is opened when opening portions of a housing and opening portions of the rotor overlap, and the valve is closed by biasing seal members to the outer peripheral wall that is the non-opening portion of the rotor by the biasing force of elastic members elastically disposed in the opening portions of the housing.

PRIOR ART REFERENCE

Patent Document

Patent Document 1: Japanese Patent Application Publication 2013-249904

SUMMARY OF THE INVENTION

Task to be Solved by the Invention

In a case where cooling water is distributed to a plurality of auxiliary machines by the flow rate control valve, that is, in a case where a plurality of opening portions of the rotor are circumferentially formed, if the opening portions are formed at the same time of the molding of the valve body, there is a case where it is necessary to divide a molding die into plural parts (for example, it is divided into three parts) depending on the quantity and the position of the opening portion. In this case, by the above division, unevenness is formed by a so-called parting line at a circumferential position corresponding to the mating surface of the molding dies in the outer peripheral wall of the rotor.

If unevenness is formed, similar to the related art flow rate control valve, in a case where a structure is adopted in which the seal member is pressed to the outer peripheral wall of the rotor for sealing, and the valve is closed, there is a risk that the seal surface of the seal member is damaged by sliding the seal member against the uneven portion.

The present invention was made in consideration of such a technical problem. An object of the present invention is to provide a flow rate control valve which is capable of suppressing the seal surface of a seal member from being damaged.

Means for Solving the Problem

In the present invention, a flow rate control valve has seal members arranged radially between a housing and a valve body rotatably supported inside the housing, the seal members hermetically sealing the space radially between the housing and the valve body by sliding against the outer peripheral surface of the valve body, and is characterized in that a flow rate of fluid flowing out from the inner peripheral side of the valve body or flowing into the inner peripheral side of the valve body is changed by changing the overlap states between communication ports communicating the inside and the outside of the housing and respective opening portions communicating the inside and the outside of the valve body, and parting lines are provided at positions not sliding against the seal members in the valve body.

In addition, regarding providing each of the parting lines at the positions not sliding against the seal members in the valve body, various kinds of aspects are included. For example, in addition to simply providing the parting lines at a non-seal area (an unused area) at which the seal members do not slide against the sliding contact surfaces of the valve body, level difference parts are provided. The level difference parts are lower than the sliding contact surfaces radially inward, so as to be recessed relative to the sliding contact surfaces (e.g., with respect to an outermost surface of the seal members). The level difference parts are provided, in advance, on the sliding contact surfaces of the valve body, against which the seal members slide, within ranges in which at least the communication ports and the respective opening portions overlap, in the circumferential range of the valve body. The parting lines are provided in the respective level difference parts.

Effects of the Invention

According to the present invention, it is possible to avoid the issue of the seal surfaces of the seal members sliding against the parting lines, and thereby damage to the seal surfaces of the seal members can be suppressed.

At this time, in a case where the parting lines are provided at the unused area that is the non-seal area, machining is not necessary even if the parting lines are formed, and there is a benefit that the valve body is manufactured in a superior manner.

On the other hand, as mentioned above, in a case where the level difference parts are formed on the seal-sliding contact surfaces in advance, and the parting lines are provided within the respective level difference parts, it becomes possible to reduce the non-seal area, and there is the benefit that the size of the valve body can be reduced.

BRIEF EXPLANATION OF THE DRAWINGS

FIG. 16 (a) shows a state in which all discharge ports are in non-communication states, FIG. 16 (b) shows a state in which only a first discharge port is in a communication state, and FIG. 16 (c) shows a state in which the first and a second discharge ports are in communication states, and FIG. 16 (d) shows a state in which all of the discharge ports are in communication states.

FIG. 17 (a) shows a state before a first seal member passes through a first level difference part, and FIG. 17 (b) shows a state when the first seal member is passing through the first level difference part.

FIG. 19 (a) shows a state before a third seal member passes through a third level difference part, and FIG. 19 (b) shows a state when the third seal member is passing through the third level difference part.

MODE FOR IMPLEMENTING THE INVENTION

In the following, each embodiment of a flow rate control valve according to the present invention will be explained based on the drawings. In addition, in each of the following embodiments, the flow rate control valve of the present invention that is applied to a conventional circular system of cooling water for a vehicle (hereinafter, simply called "cooling water"), which is the same as a conventional one, is described as an example.

First Embodiment

Figure 1:
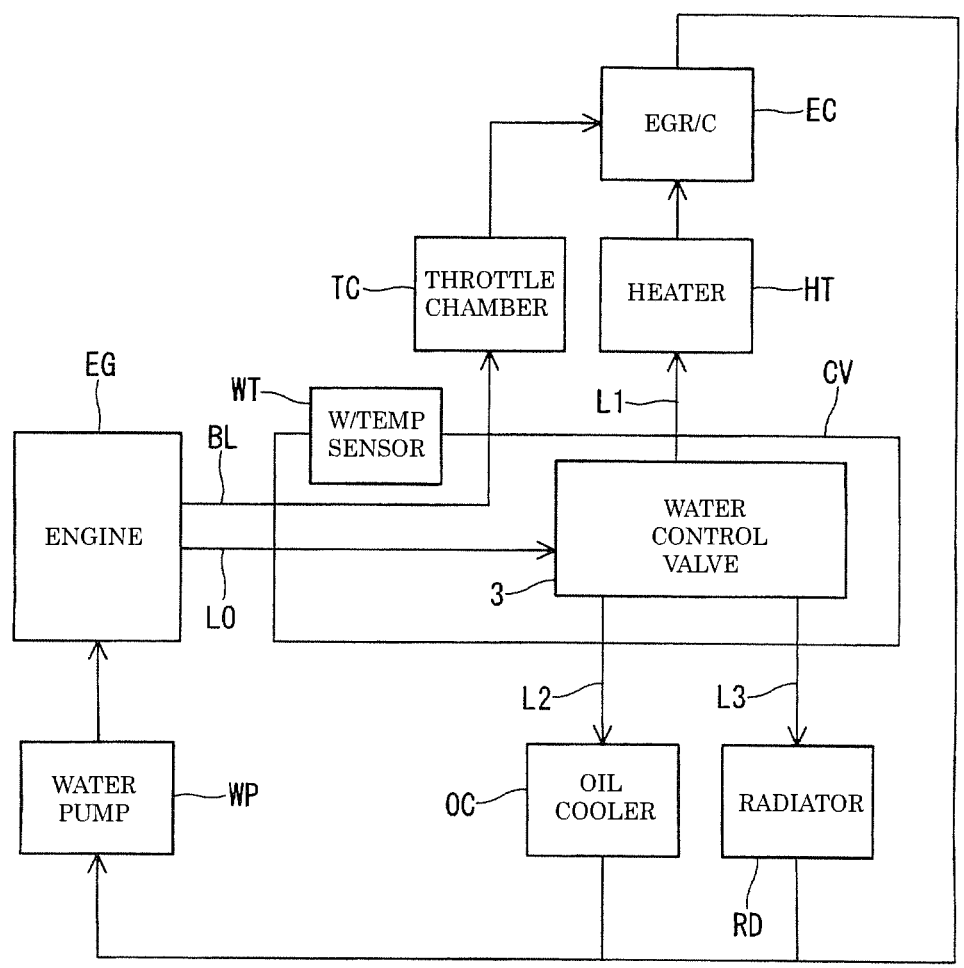
FIG. 1 is a circuit diagram of cooling water used to explain a flow rate control valve according to the present invention when it is applied to a circulation system of cooling water for a vehicle.

FIG. 1 to FIG. 18 show a first embodiment of the flow rate control valve according to the present invention. First, a circulation circuit of the cooling water in which a flow rate control valve CV is applied will be explained. As shown in FIG. 1, the flow rate control valve CV is arranged at the side part of an engine EG (specifically, a cylinder head which is not shown in the drawings), and disposed between the engine EG and a heater heat exchange HT (an EGR cooler EC), an oil cooler OC and a radiator RD. In addition, the flow rate control valve CV distributes the cooling water introduced to the flow rate control valve CV through an introduction passage L0 by being pressurized by a water pump WP to the heater heat exchanger HT, the oil cooler OC and the radiator RD through respective first to third pipes L1 to L3, and controls each flow rate of the first to third pipes L1 to L3. At this time, the cooling water introduced to the heater heat exchanger HT is, after being introduced to the EGR cooler EC, circulated to the engine EG.

In addition, the flow rate control valve CV is provided with a bypass passage BL for directly introducing the cooling water to a throttle chamber TC bypassing the introduction passage L0, and by the bypass passage BL, the cooling water introduced from the engine EG can be always supplied to the throttle chamber TC. The cooling water supplied to the throttle chamber TC is, similar to the cooling water introduced to the heater heat exchanger HT, introduced to the EGR cooler EC, following which the cooling water is circulated to the engine EG through the EGR cooler EC. A sign WT in FIG. 1 indicates a water temperature sensor.

Figure 2:
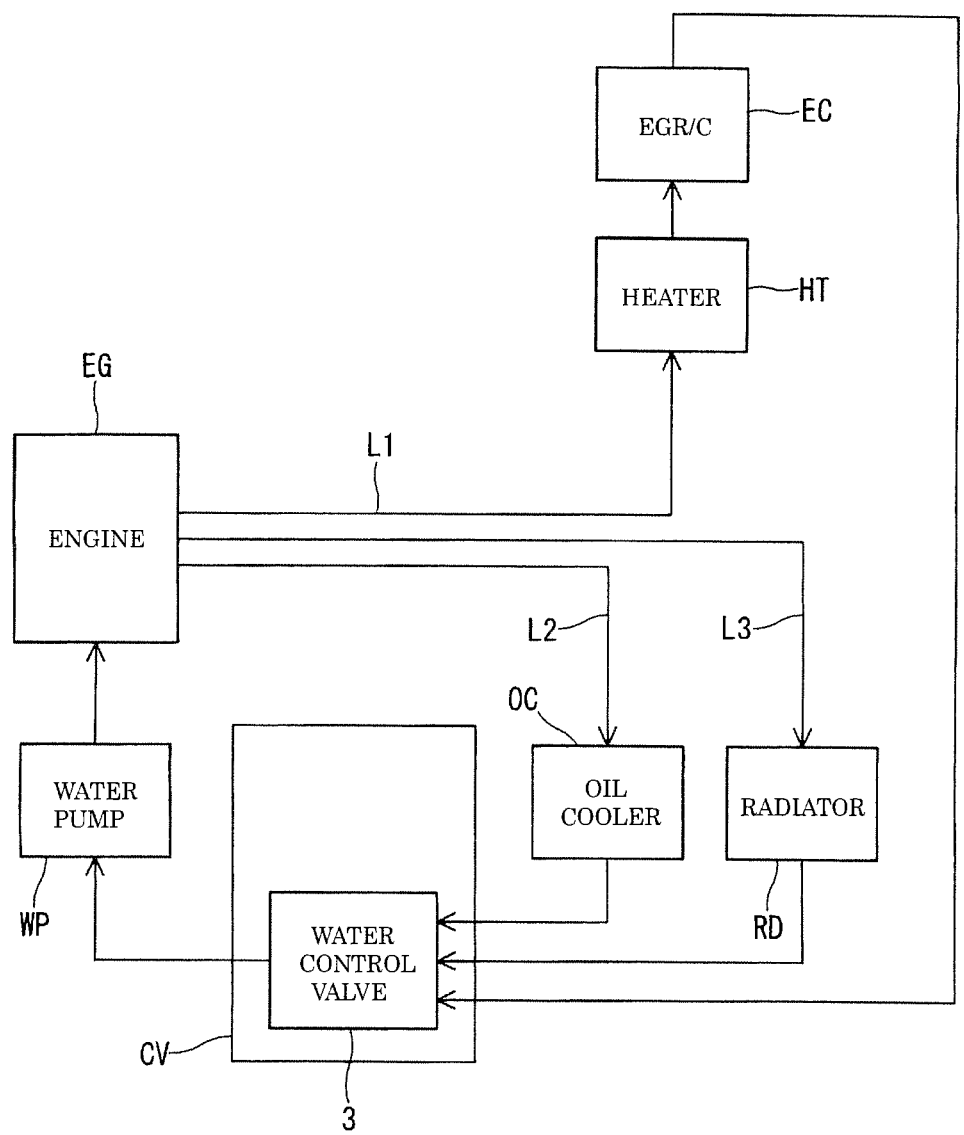
FIG. 2 is a circuit diagram of cooling water showing another application example of the flow rate control valve according to the present invention.

In addition, the arrangement of the flow rate control valve CV is not limited to the arrangement immediately after the engine EG, and, for example, as shown in FIG. 2, the flow rate control valve CV may be arranged immediately before the engine EG, and the arrangement can be preferably changed according to the specifications of an object on which the flow rate control valve CV is mounted. As to the distribution of the cooling water to the throttle chamber TC, as mentioned below, it is not applicable to an object for the flow rate control of the cooling water. Further, the presence or absence of the bypass passage BL, shown in FIG. 2, is therefore preferably changed according to the specifications of an object on which the flow rate control valve CV is mounted.

Figure 3:
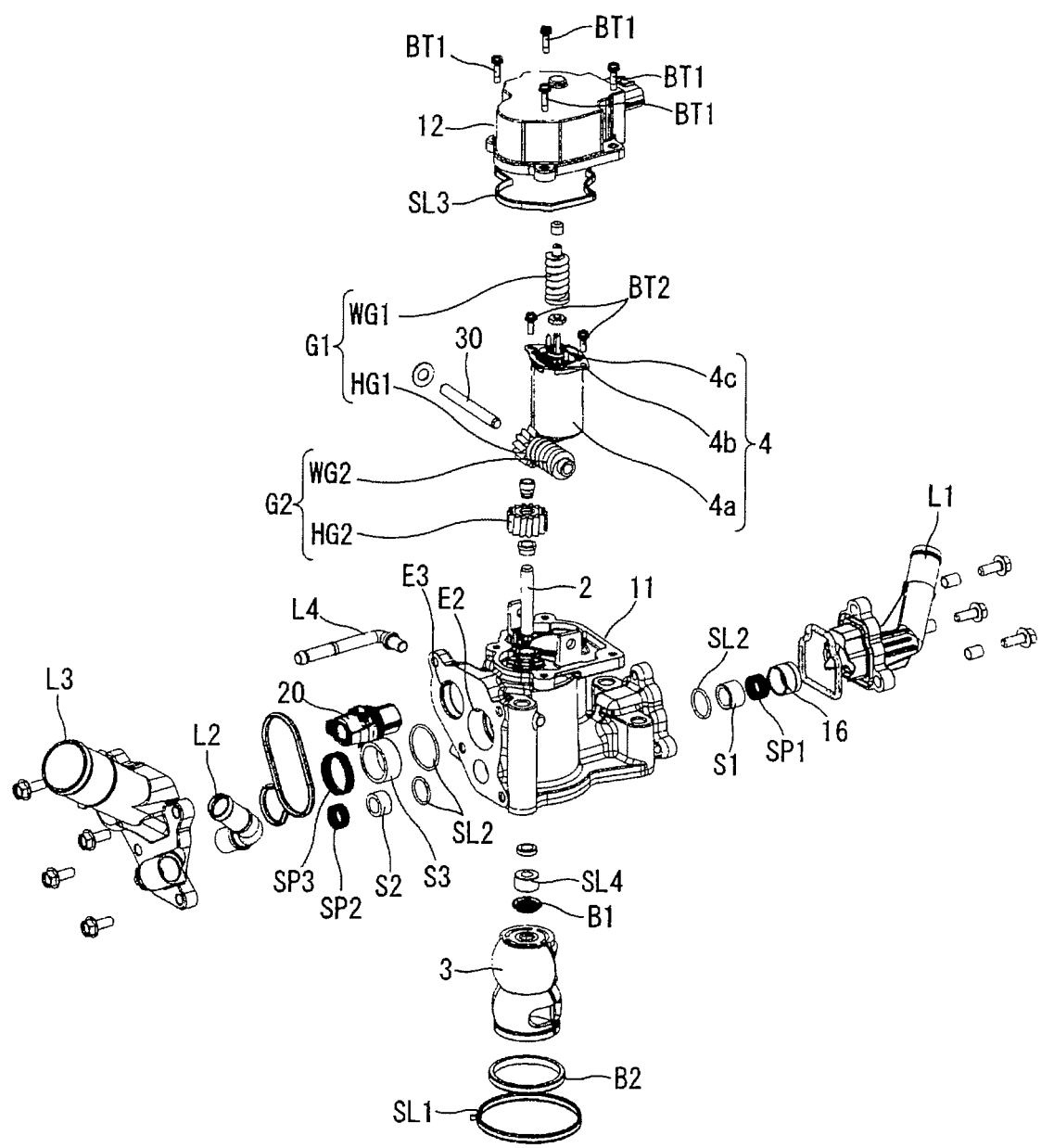
FIG. 3 is a perspective exploded view of the flow rate control valve according to a first embodiment of the present invention.
Figure 4:
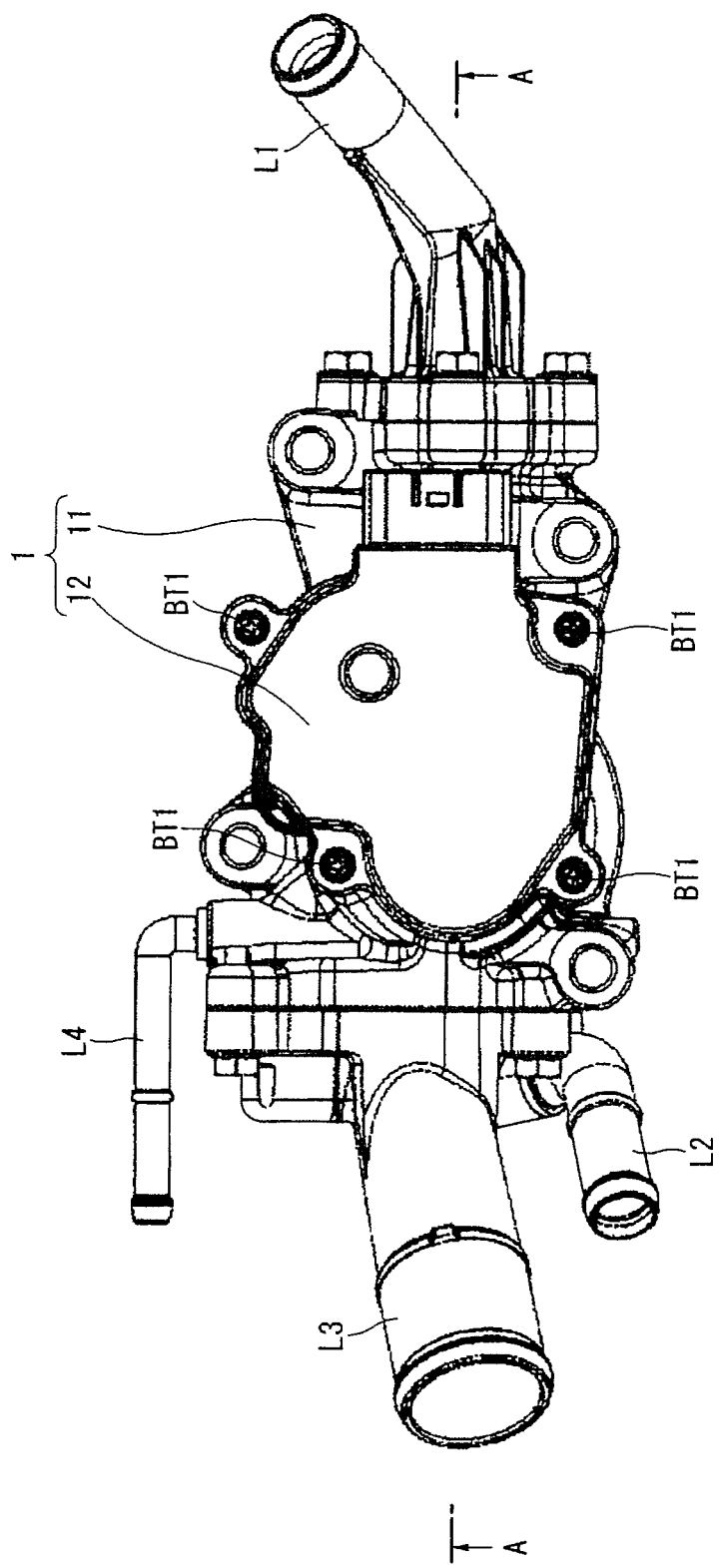
FIG. 4 is a plan view of the flow rate control valve shown in FIG. 3.
Figure 15:
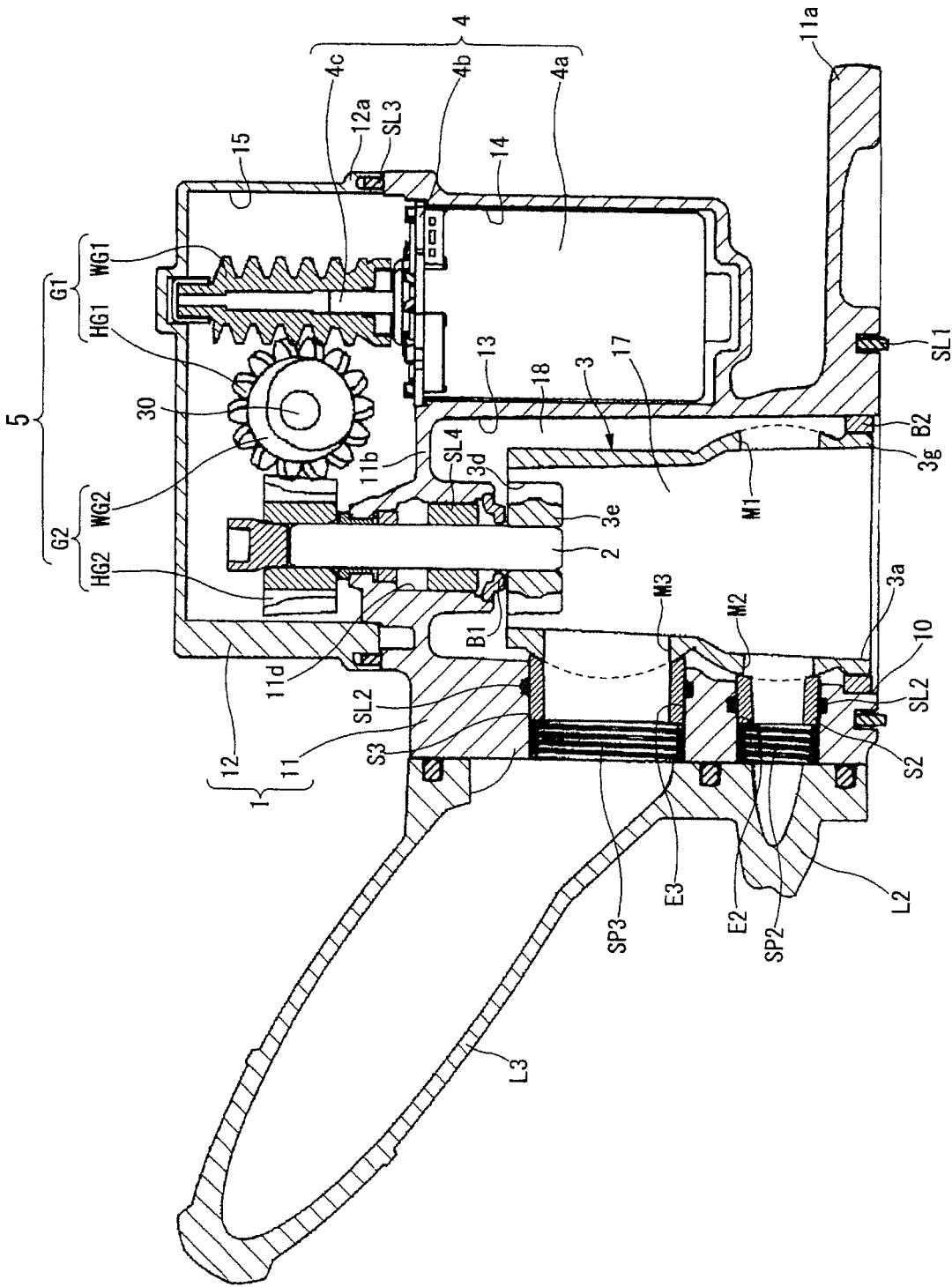
FIG. 15 is a sectional view taken along a line F-F of FIG. 14.

Next, a specific configuration of the flow rate control valve CV will be explained. As shown in FIG. 3 and FIG. 15, the flow rate control valve CV is mainly configured of a housing 1 formed of a first housing 11 accommodating the after-mentioned valve body 3 and electric motor 4 and a second housing 12 accommodating the after-mentioned reduction gear mechanism 5, a rotation shaft 2 which is inserted into and disposed in an end wall 1ib of the first housing 11, end wall 1ib which defines the first housing 11 and the second housing 12, and which is rotatably supported on a bearing B1 held by the end wall 1ib, the substantially cylindrical valve body 3 which is fixed to one end part of the rotation shaft 2 and which is rotatably supported in the first housing 11, an electric motor 4 which is arranged parallel to the valve body 3 in the first housing 11 and which is used for drive control of the valve body 3, and a reduction gear mechanism 5 which is interposed between a motor output shaft 4c of the electric motor 4 and the rotation shaft 2 and which reduces the speed of the rotation of the electric motor 4 and transmits it.

The first housing 11 is a housing which is cast with aluminum alloy material. The first housing 11 is provided with a substantially cylindrical valve accommodating part 13 opening toward one end side in an axial direction, valve accommodating part 13 which is provided so as to be close to one end side in a width direction and accommodates the valve body 3, and with a substantially cylindrical motor accommodating part 14 opening toward the other end side in the axial direction, motor accommodating part 14 which is provided so as to be close to the other end side in the width direction so as to be adjacent to the valve body accommodating part 13 and accommodates the electric motor 4. The first housing 11 is fixed to a side part of the engine, which is not shown in the drawings, with bolts, which are not shown in the drawings, through a first flange portion 11*a* formed extending from the outer peripheral area of the opening at one end side of the valve body accommodating part 13. In addition, at the time of the attachment of the first housing 11, an annular seal member SL1 is interposed between the first flange portion 11*a* of the first housing 11 and the side part of the engine, and thereby the inside of the valve body accommodating part 13 is hermetically held by the seal member SL1.

The one end side opening of the valve body accommodating part 13 is formed as an introduction port 10 as a main communication port introducing the cooling water from the inside of the engine which is not shown in the drawings by communicating with the inside of the engine, and the cooling water is introduced to an inner peripheral side passage 17 and an outer peripheral side passage 18 respectively formed at the inner peripheral side and the outer peripheral side of the valve body 3 through the introduction port 10. In addition, a plurality of substantially cylindrical first to third discharge ports E1 to E3 as communication ports which respectively connect the first to the third pipes L1 to L3 are radially formed through at predetermined positions of the peripheral wall of the valve body accommodating part 13. In the first to the third discharge ports E1 to E3, the first discharge ports E1 having a middle diameter which communicates with the heater heat exchanger HT and the second discharge port E2 having a small diameter which communicates with the oil cooler OC are arranged to overlap with each other in the axial direction of the valve body accommodating part 13 (they are radially substantially opposed to each other), and the second discharge port E2 having a small diameter which communicates with the oil cooler OC and the third discharge port E3 having a large diameter which communicates with the radiator RD are arranged parallel to each other in the axial direction of the valve body accommodating part 13. The first and the second discharge ports E1 and E2 are arranged close to the introduction port 10, and the third discharge port E3 is arranged close to the end wall 11*b*.

Figure 5:
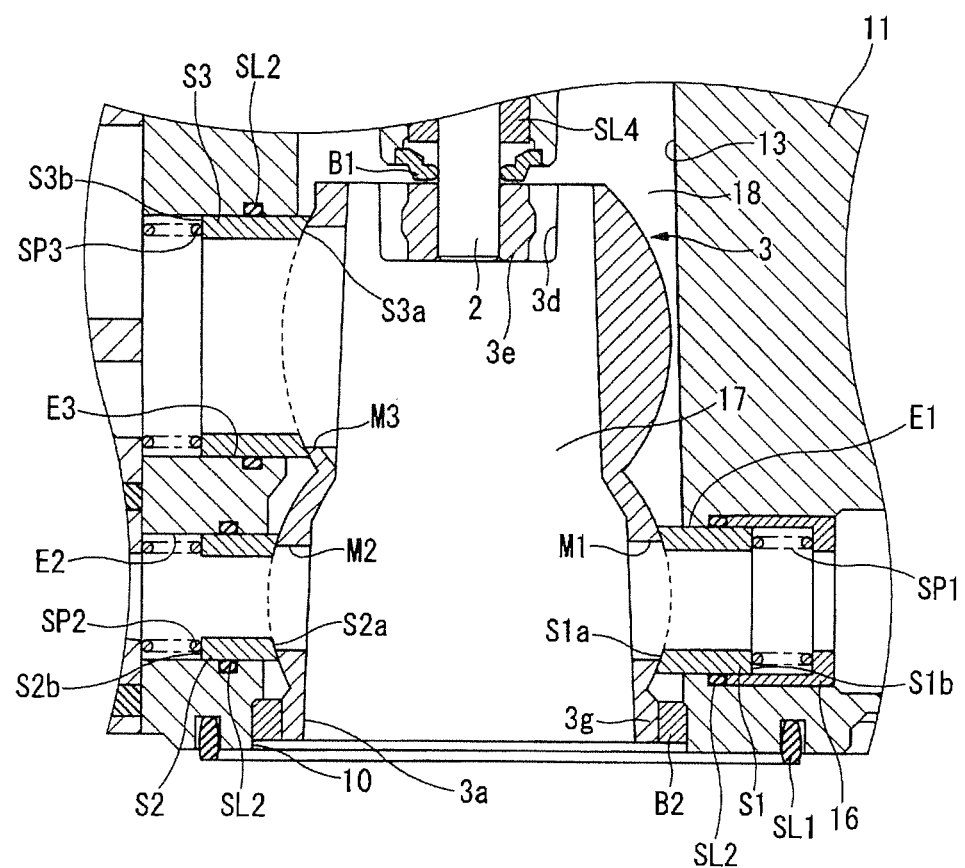
FIG. 5 is a sectional view taken along a line A-A of FIG. 4.
Figure 6:
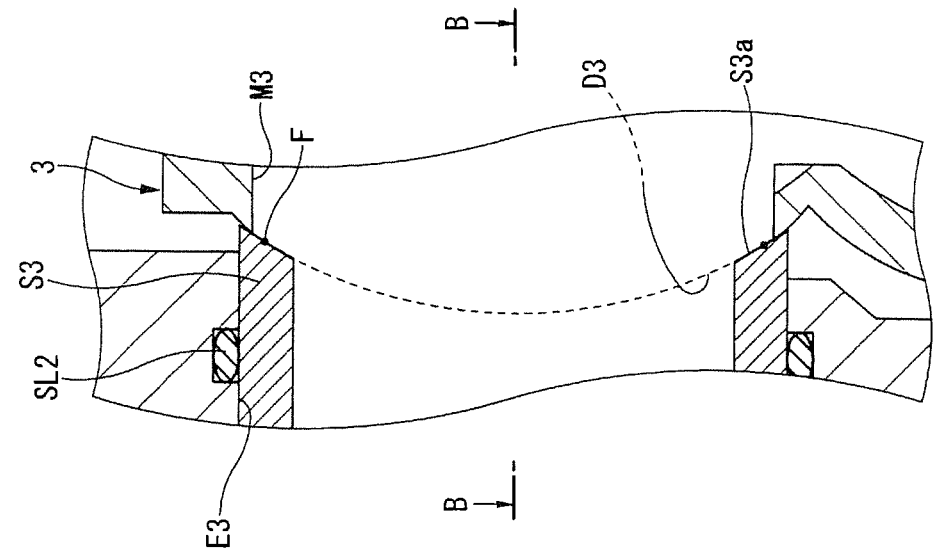
FIG. 6 (*a*) is a main part enlarged view of FIG. 5, and FIG. 6 (*b*) is a sectional view taken along a line B-B of FIG. 6 (*a*).
Figure 6:
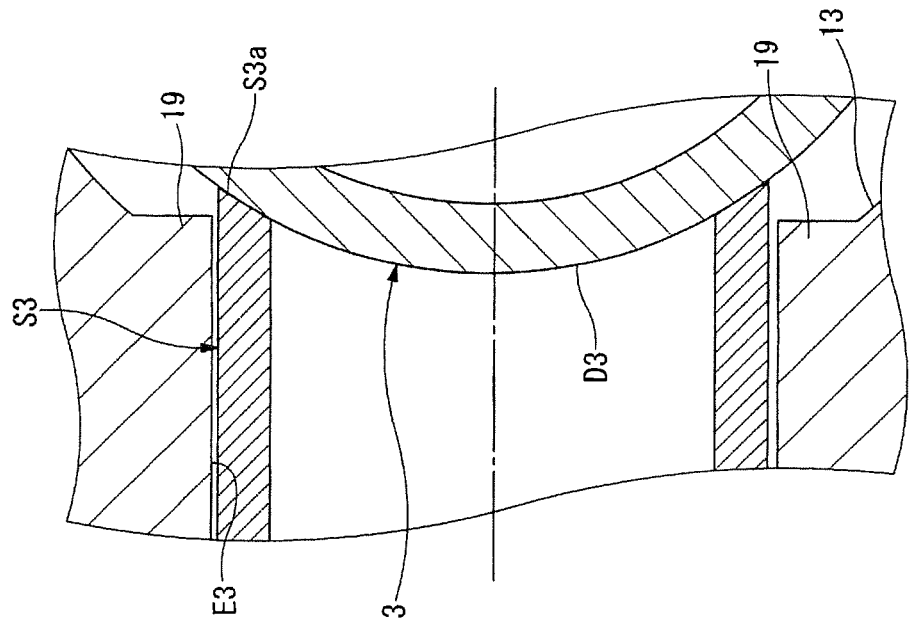

Here, as shown in FIG. 5 and FIG. 6, the inner side ends of the respective first to the third discharge ports E1 to E3 are provided with respective pad portions 19 that serve as guide portions used for sliding guiding of the after-mentioned first to third seal members S1 to S3. By casting an aluminum alloy material, the pad portions 19 are provided integrally with the first housing 11 onto the respective inner side ends of the discharge ports E1 to E3, so that the inner side end surfaces of the pad portions 19 become substantially flat. In particular, a projection amount of each of the seal members S1 to S3 from the respective inner side ends of the discharge ports E1 to E3 is suppressed. With this configuration, it is possible to suppress deformation of each of the seal members S1 to S3, and abrasion of each of the seal members S1 to S3 caused by the deformation of each of the seal members S1 to S3 is suppressed.

The inner peripheral sides of the first to the third discharge ports E1 to E3 are provided with seal means hermetically sealing the respective spaces between the discharge port E1 and the valve body 3, the discharge port E2 and the valve body 3 and between the discharge port E3 and the valve body 3 at the time of closing the first to the third discharge ports E1 to E3. This seal means is configured of the substantially cylindrical seal members S1 to S3 which are accommodated so as to be movable forward and backward in the respective inner end sides of the discharge ports E1 to E3, and which seal the respective spaces between the discharge port E1 and the valve body 3, the discharge port E2 and the valve body 3 and between the discharge port E3 and the valve body 3 by sliding against the outer peripheral surface of the valve body 3, first to third coil springs SP1 to SP3 which are provided with a predetermined pre-load and disposed at the respective spaces between the opening edge of the pipe L1 and the inner side end surface of the seal member S1, the opening edge of the pipe L2 and the inner side end surface of the seal member S2 and between the opening edge of the pipe L3 and the inner side end surface of the seal member S3, so as to be seated on the respective opening edges of the pipes L1 to L3 in the respective outer end sides of the discharge ports E1 to E3, and which bias the respective seal members S1 to S3 to the valve body 3, and of O-rings SL2 which are interposed into the respective spaces between the inner peripheral surface of the discharge port E1 and the outer peripheral surface of the sealing member S1, the inner peripheral surface of the discharge port E2 and the outer peripheral surface of the seal member S2 and between the inner peripheral surface of the discharge port E3 and the outer peripheral surface of the sealing member S3, to be accommodated in concave portions cut out and formed on the respective inner peripheral surfaces of the discharge ports E1 to E3, and which seal the respective spaces between the discharge port E1 and the seal member S1, the discharge port E2 and the seal members S2 and between the discharge port E3 and the seal member S3 by sliding against the respective outer peripheral surfaces of the seal members S1 to S3.

The inner peripheral edges of the one end sides of the respective seal members S1 to S3, the one end sides forming the side of the valve body 3, are provided with respective substantially conical tapered first to third seal surfaces S1*a* to S3*a*, which slide against the respective after-mentioned first to third seal-sliding parts D1 to D3. On the other hand, flat first to third seating surfaces S1*b* to S3*b* on which the respective one end sides of the coil springs SP1 to SP3 are seated are provided at the respective other end sides of the seal members S1 to S3. In this configuration, the seal surfaces S1*a* to S3*a* slide against the seal-sliding parts D1 to D3 respectively by a so-called line contact in which only the middle parts (specifically, see a point F on FIG. 6 (*a*)) in the width directions (in the radial directions) of the seal surfaces S1*a* to S3*a* slide against the respective seal-sliding parts D1 to D3. In addition, in the present embodiment, the seal portion F at the time of the valve closing becomes inwardly positioned with respect to the opening width of each of the after-mentioned first to third opening portions M1 to M3 in the rotation axis direction of the valve body 3.

Figure 7:
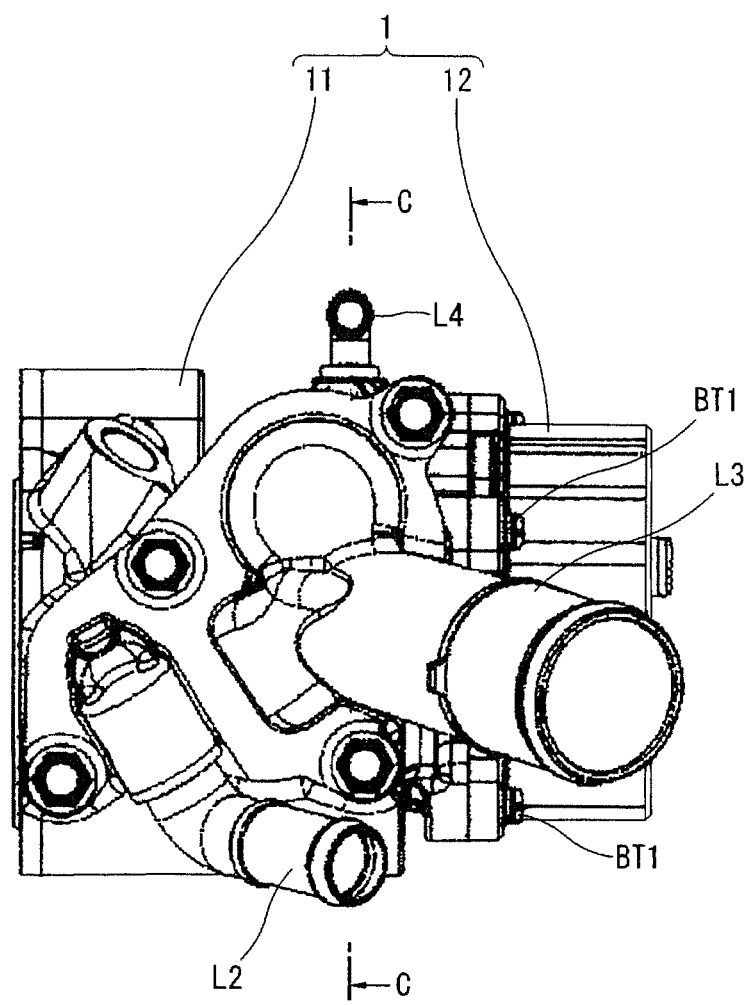
FIG. 7 is a side view of the flow rate control valve shown in FIG. 4.
Figure 8:
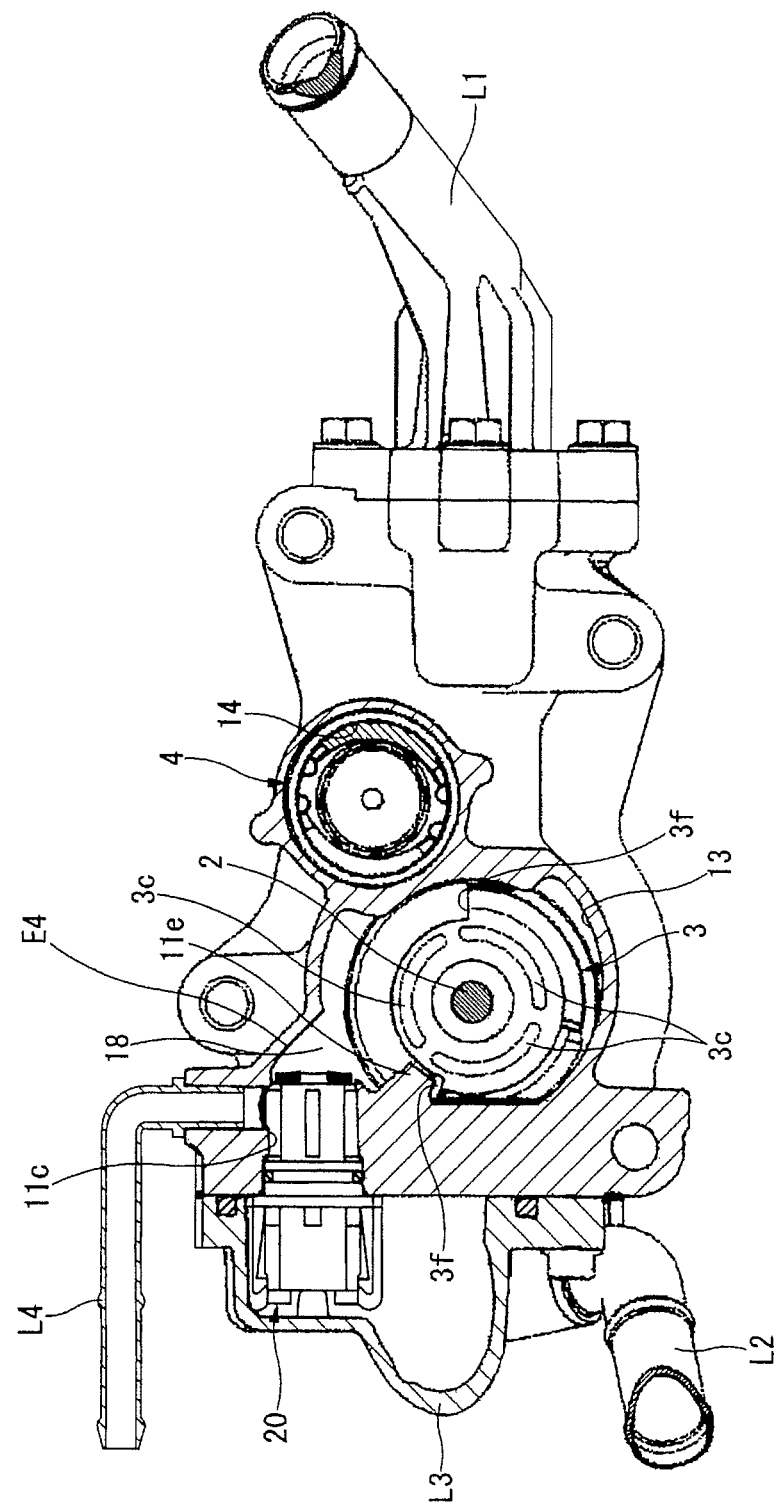
FIG. 8 is a sectional view taken along a line C-C of FIG. 7.

In addition, as shown in FIG. 7 and FIG. 8, a fourth discharge port E4 is formed through the other end side of the valve body accommodating part 13. The inner end side of the fourth discharge port E4 faces the outer peripheral side passage 18, and a fourth pipe L4 is connected to the outer end side of the fourth discharge port E4, and the cooling water is introduced into the throttle chamber TC. With this, the bypass passage BL (see FIG. 1) is configured. Such a configuration allows for distribution of the cooling water introduced into the outer peripheral side passage 18 to the throttle chamber TC always through the fourth pipe L4, regardless of the after-mentioned rotation phase of the valve body 3.

Figure 9:
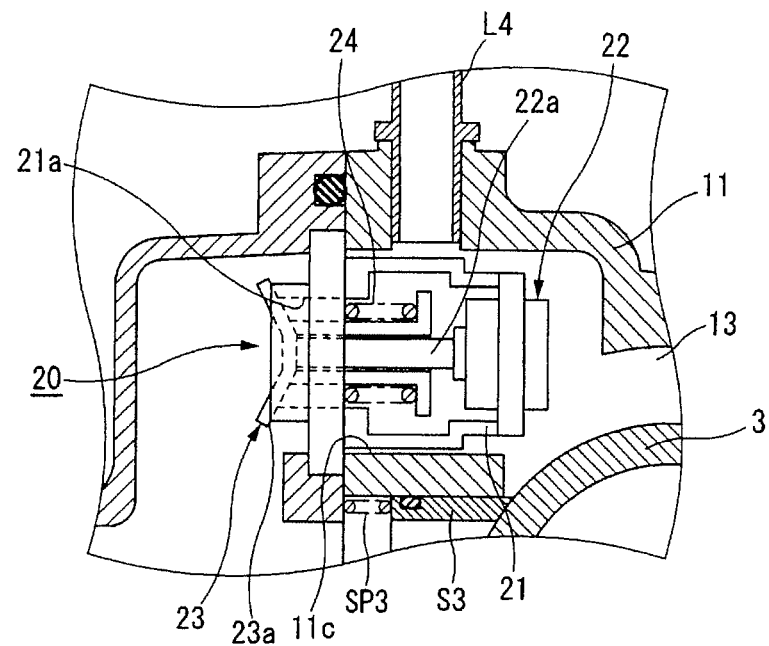
FIG. 9 is a longitudinal sectional view of a fail-safe valve shown in FIG. 3, and FIG. 9 (a) is a drawing showing a valve closed state and FIG. 9 (b) is a drawing showing a valve opened state.
Figure 9:
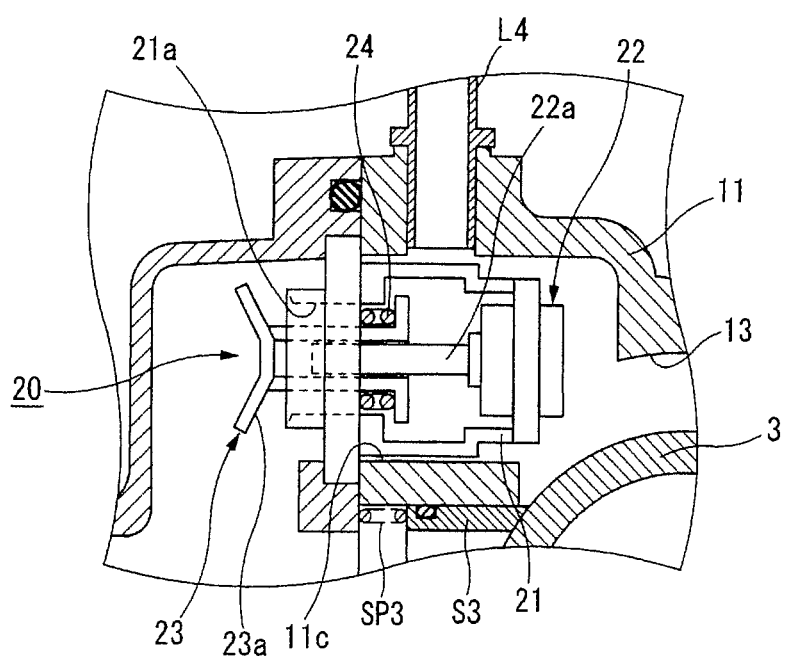

Moreover, as shown in FIG. 3, FIG. 8 and FIG. 9, a fail-safe valve 20 is provided at the side part of the third discharge port E3. The fail-safe valve 20 is capable of communicating the valve body accommodating part 13 (the outer peripheral side passage 18) with the third discharge port E3 in an emergency in which the valve body 3 cannot be driven due to, for example, failure of an electrical system. The fail-safe valve 20 is capable of preventing overheat of the engine EG by securing a supply of the cooling water to the radiator RD, even if the valve body 3 is in an unmovable state.

The fail-safe valve 20 is mainly configured of a substantially cylindrical flow passage constituting member 21 which is accommodated in a valve accommodating port 11c communicating the outer peripheral side passage 18 and the third pipe L3 and which allows inflow of the cooling water from the inner end side (from the outer peripheral side passage 18 side), a thermo-element 22 which is provided so as to be accommodated at the inner peripheral side of the flow passage constituting member 21 and which is formed so that when the temperature of the cooling water exceeds a predetermined temperature, wax (not shown in the drawings) filled in the thermo-element 22 expands, then a rod 22a of the thermo-element 22 moves to the outer end side of the passage constituting member 21, a valve member 23 which is fixed to the distal end of the rod 22a of the thermo-element 22 and which is used for opening and closing an outflow port 21a opened at the outer end side of the flow passage constituting member 21, and a coil spring 24 which is elastically installed with a predetermined pre-load between the valve member 23 and the flow passage constituting member 21 and which biases the valve member 23 in a valve closing direction.

By the above configuration, in a normal state (e.g., when the temperature of the cooling water is less than the predetermined temperature), a substantially conical taper-shaped valve portion 23a of the valve member 23 is pressurized to the outer side port edge of the outflow port 21a by the biasing force of the coil spring 24, and thereby a valve closed state is maintained. On the other hand, in a high temperature state (e.g., when the temperature of the cooling water is at the predetermined temperature or higher), the wax inside the thermo-element 22 expands, the valve member 23 moves to the outer end side of the flow passage constituting member 21 with rod 22a against the biasing force of the coil spring 24, the valve member 23 is opened, and an inflow port which is not shown in the drawings and the outflow port 21a are communicated, and thereby the cooling water introduced into the outer peripheral side passage 18 is supplied to the radiator RD through the third pipe L3.

In addition to a rise in the temperature of the cooling water, also in a case where the pressure of the cooling water exceeds a predetermined pressure, the valve member 23 is pushed and retracted against the biasing force of the coil spring 24, and the inflow port which is not shown in the drawings and the outflow port 21a are communicated. With this, as a result of a decrease in the inside pressure of the flow rate control valve CV, it becomes possible to avoid failure of the flow rate control valve CV.

As shown in FIG. 3 and FIG. 15, one end side of the second housing 12 which faces the first housing 11 is formed in a concave shape extending over the valve body accommodating part 13 and the motor accommodating part 14 and opened so as to cover both of the accommodating parts 13 and 14, and is fixed with a plurality of bolts BT1 to the other end side of the first housing 11 through a second flange portion 12a formed extending from the outer peripheral area of the one end side opening, and a reduction gear mechanism accommodating part 15 accommodating the reduction gear mechanism 5 is formed between the second housing 12 and the other end side of the first housing 11. In addition, at the time of the joining of the first and the second housings 11 and 12, an annular seal member SL3 is interposed between the joining surfaces of the first and the second housings 11 and 12, and thereby the inside of the reduction gear mechanism accommodating part 15 is hermetically held.

The rotation shaft 2 is rotatably supported on the bearing B1 accommodated and disposed in a shaft insertion hole 11d formed through the end wall 11b corresponding to the other end wall of the valve body accommodating part 13. The valve body 3 is integrally rotatably fixed to the one end portion in the axis direction of the rotation shaft 2, and the after-mentioned second helical gear HG2 is integrally rotatably fixed to the other end portion in the axis direction of the rotation shaft 2. In addition, an annular seal member SL4 is interposed between the outer peripheral surface of the rotation shaft 2 and the inner end side opening edge of the shaft insertion hole 11d, and by the seal member SL4, the inflow of the cooling water from the valve body accommodating part 13 to the reduction gear mechanism accommodating part 15 through the space radially between the shaft insertion hole 11d and the rotation shaft 2 is suppressed.

The valve body 3 is integrally formed by molding with a predetermined synthetic resin material. As shown in FIG. 5 and FIG. 10 to FIG. 12, one end side in the axial direction of the valve body 3 is opened as an inflow port 3a used for the inflow of the cooling water introduced from the introduction port 10 of the first housing 11 to the inner peripheral side passage 17. On the other hand, the other end side of the valve body 3 is closed by an end wall 3b, and a plurality of substantially arc-shaped communication ports 3c which are capable of communicating the inner peripheral side passage 17 with the outer peripheral side passage 18 are cut out and formed on the end wall 3b along a circumferential direction. In addition, at the middle part of the end wall 3d corresponding to the axial center of the valve body 3, a substantially cylindrical shaft fixing portion 3d used for attachment to the rotation shaft 2 is formed extending along the axial direction of the valve body 3, and an insert member 3e made of metal is integrally formed at the inner peripheral side of the shaft fixing portion 3d, and the rotation shaft 2 is press-fitted through the insert member 3e.

In addition, the valve body 3 is formed in a shape in which balls are joined to each other, in which the substantially spherical seal-sliding parts (the after-mentioned first to third seal-sliding parts D1 to D3) are connected axially in series which are used for sealing action at the time of the valve closing by sliding against the respective seal members S1 to S3. By rotating within a predetermined angle range of approximately 180 degrees in a circumferential direction, the opening/closing of each of the discharge ports E1 to E3 is performed. In addition, as to the rotation, the valve body 3 is rotatably supported on a bearing B2 fitted into and held on the inner peripheral side of the introduction port 10 at the one end side through a bearing portion 3g whose diameter is enlarged.

Here, as to the formation of each of the seal-sliding parts D1 to D3, the valve body 3 is mainly divided into two axial direction areas: a first axial direction area X1 at the one end side of the valve body 3, and a second axial direction area X2 at the other end side. In addition, these first and second axial direction areas X1 and X2 are divided substantially equally at the substantially middle position in the axial direction of the valve body 3 as a boundary. In addition, even in either the axial direction area X1 or the axial direction area X2, the port edges of at least the after-mentioned first to third opening portions M1 to M3 are formed in substantially spherical shapes in cross sections, that is, formed in curved surface shapes having substantially the same curvature, and the curvature is set so as to be the same as the rotation radius of the valve body 3.

Figure 11:
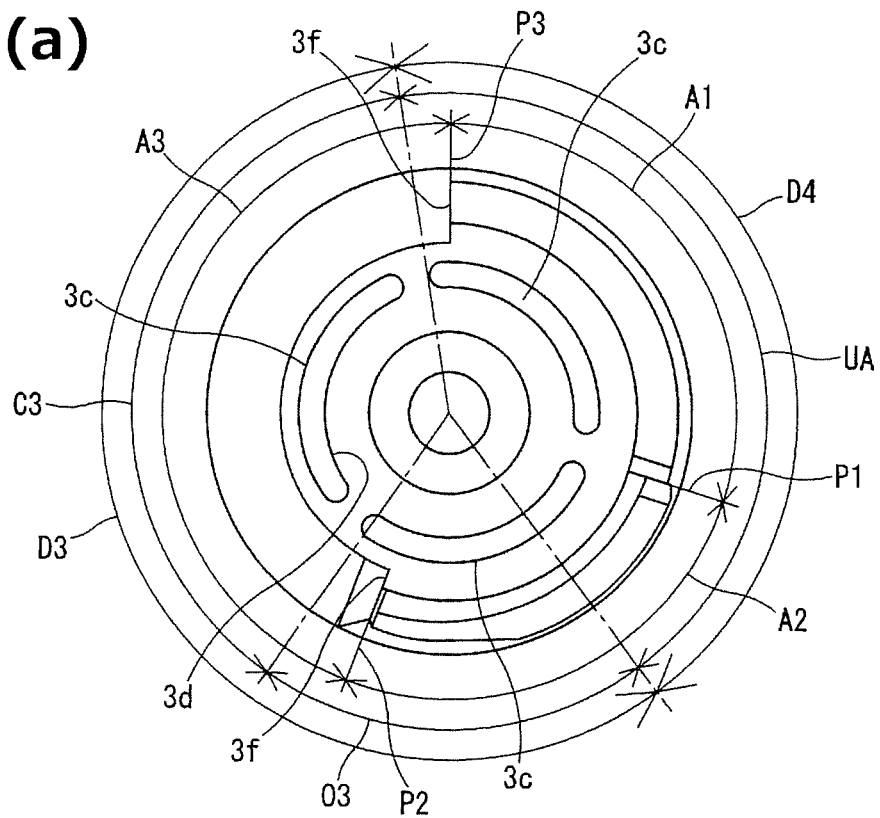
FIG. 11 (a) is a drawing viewed from an arrow D direction of FIG. 10 (a), and FIG. 11 (b) is a sectional view taken along a line E-E of FIG. 10 (a).
Figure 11:
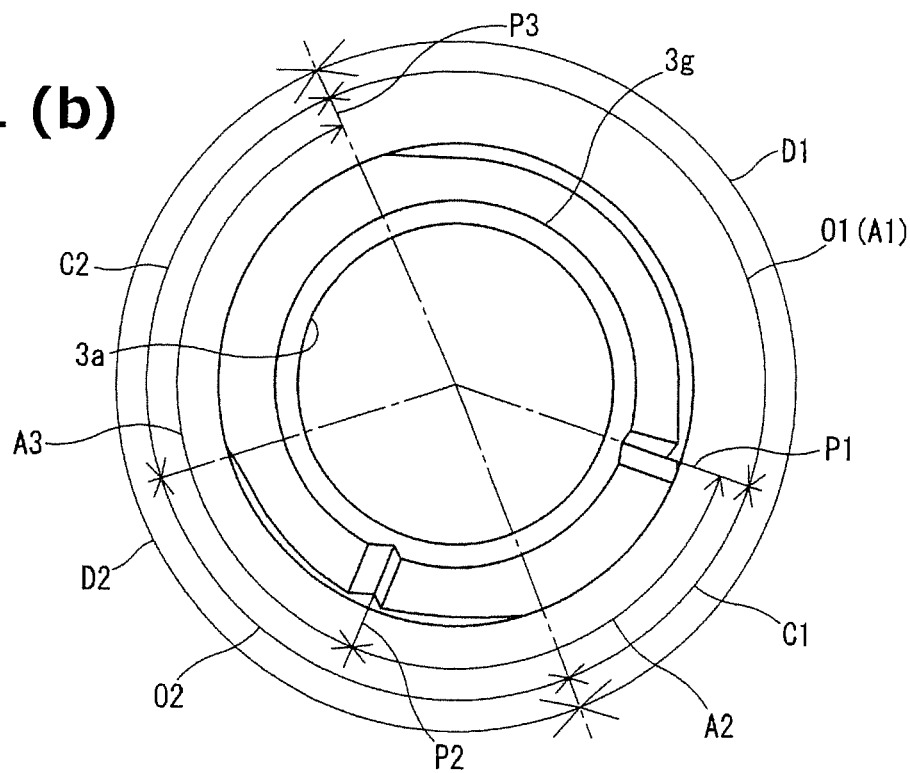

As shown in FIG. 11 (b), the first axial direction area X1 is formed of the first seal-sliding part D1 which is provided over a substantially half circumference of the valve body 3 and which slides against the first seal member S1, and the second seal-sliding part D2 which is provided over the remaining half circumference and which slides against the second seal member S2. The first seal-sliding part D1 is provided with the rectangular first opening portion M1 set to have an axial direction width capable of substantially completely overlapping with the first discharge port E1, along the circumferential direction of the valve body 3. Similarly, the second seal-sliding part D2 is provided with the oval hole-shaped second opening portion M2 set to have an axial direction width capable of substantially completely overlapping with the second discharge port E2, along the circumferential direction of the valve body 3.

Here, in the present embodiment, as described above, the first opening portion M1 is provided at a different circumferential position from the second opening portion M2 in the first axial direction area X1 so as to overlap with each other in the rotation axis direction of the valve body 3, and thereby the size in the axial direction of the valve body 3 is reduced.

Figure 18:
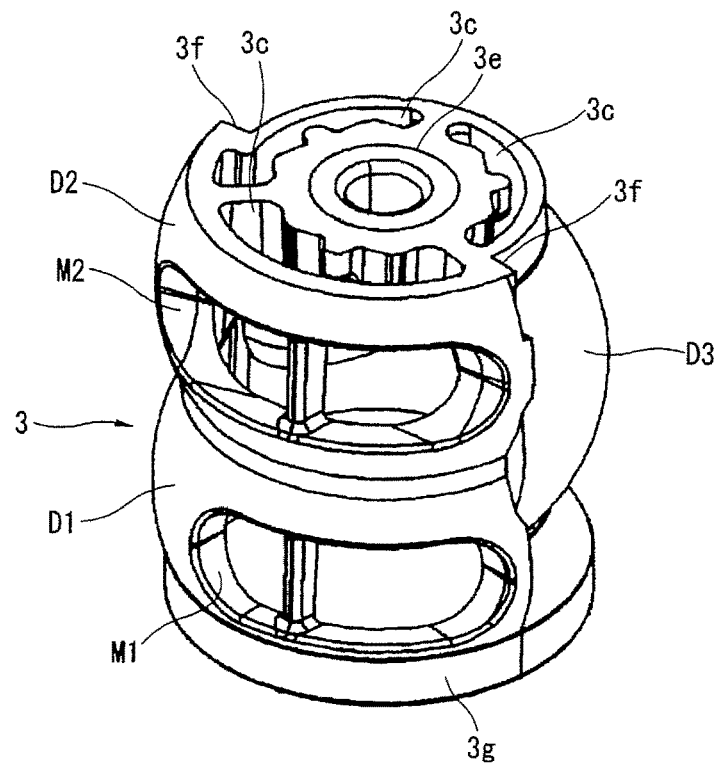
FIG. 18 is a perspective view of a valve body showing another example of the valve body shown in FIG. 3.
Figure 18:
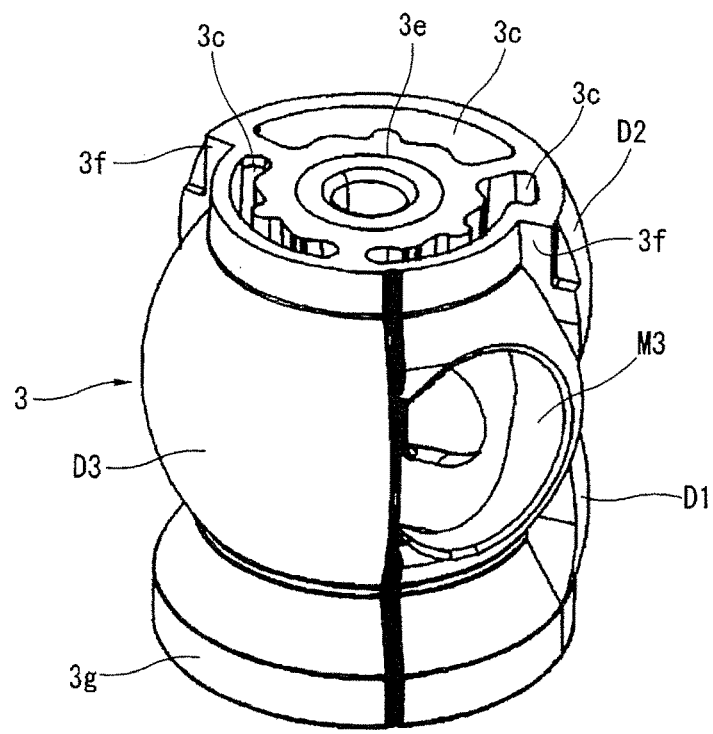

In addition, the above overlapping position is not limited to a position where the opening portions M1 and M2 completely overlap with each other in the axial direction like the present embodiment. For example, as shown in FIG. 18, it is sufficient to be arranged so that at least a part of each of the opening portions M1 to M2 overlaps with the opening portion M3 in the rotation axis direction. By this arrangement, the valve 3 can be shortened in the axial direction by the amount of the overlap.

As shown in FIG. 11 (a), the second axial direction area X2 is formed of the third seal-sliding part D3 provided over a half circumference or more of the valve body 3 and which slides against the third seal member S3, and a non-seal-sliding part D4 provided over the remaining circumferential area and which is not opposite to the third discharge port E3 and not used for sealing action by the third seal member S3. The third seal-sliding part D3 is provided with the oval hole-shaped third opening portion M3 set to have an axial direction width capable of substantially completely overlapping with the third discharge port E3, along the circumferential direction of the valve body 3.

In addition, an auxiliary suction port M4 having a rectangular shape in a plan view is provided on the non-seal-sliding part D4 along the circumferential direction of the valve body 3. The auxiliary suction port M4 is used for introducing the cooling water flowing the outer peripheral side passage 18 into the inner peripheral side passage 17. In addition to the inflow port 3a, the auxiliary suction port M4 permits the introduction of the cooling water into the inner peripheral side passage 17. A larger amount of the cooling water is taken into the inside of the inner peripheral side passage 17 and is discharged from each of the discharge ports E1 to E3, and thereby introduction resistance of the cooling water is reduced. In addition, since the non-seal-sliding part D4 is a so-called unused area, the non-seal-sliding part D4 is formed in a flat shape as a non-spherical surface shape which is different from the first to the third seal-sliding parts D1 to D3 formed in substantially spherical shapes, and consequently, the weight of the valve body 3 and the amount of the material forming the valve body 3 are reduced.

Figure 16:
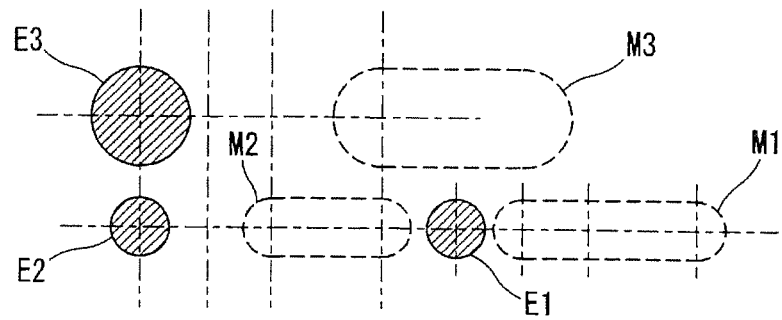
FIG. 16 (a) to FIG. 16 (d) are drawings showing developed views of a valve accommodating part to explain an operation state of the flow rate control valve according to the present invention.
Figure 16:
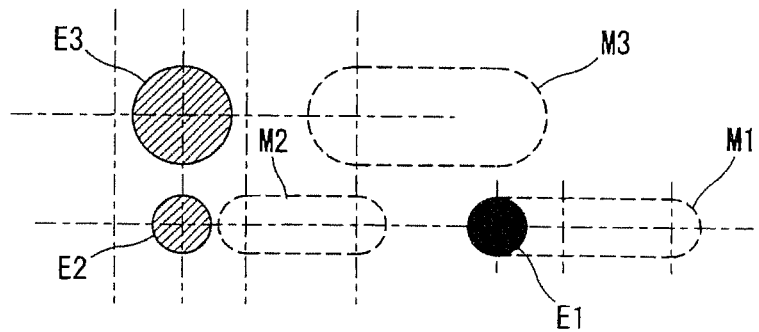
Figure 16:
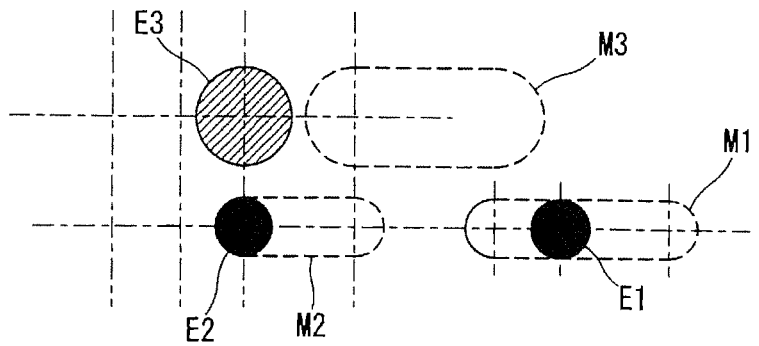
Figure 16:
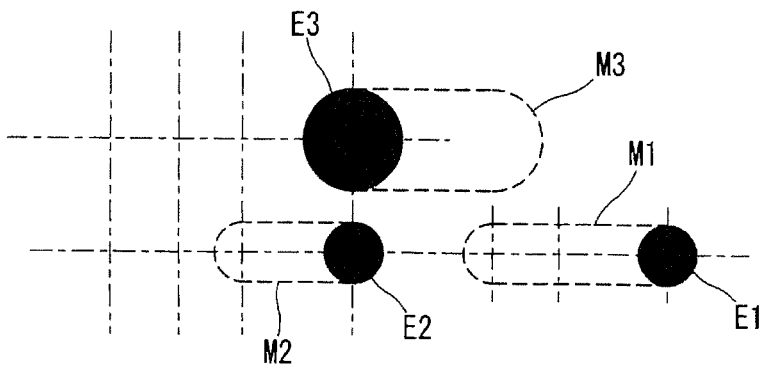

The shape and the circumferential position of each of the first to the third opening portions M1 to M3 provided as above are set so that their communication states with the first to the third discharge ports E1 to E3 are changed by the rotation of the valve body 3 in an order from first to fourth states, which are shown in FIG. 16 and described later.

In addition, as show in FIG. 11 (b), the first axial direction area X1 is formed of a first valve opening area O1 and a second valve opening area O2 used for valve opening by the first and the second opening portions M1 and M2, and a first valve closing area C1 and a second valve closing area C2 used for valve closing by the first and the second seal members S1 to S2. Similarly, as shown in FIG. 11 (a), the second axial direction area X2 is formed of a third valve opening area O3 used for the valve opening by the third opening portion M3, a third valve closing area C3 used for the valve closing by the third seal member S3 and an unused area UA forming the non-seal-sliding portion D4.

In the first axial direction region X1, a concave first level difference part N1 which is recessed radially inward is cut out and formed linearly and continuously from the one end side to the other end side of the valve body 3 at the circumferential direction end of the first opening portion M1. The circumferential direction end is in the vicinity of the boundary part between the first valve opening area O1 and the first valve closing area C1. Similarly, in the first and the second axial direction areas X1 and X2, a concave second level difference part N2 which is recessed radially inward is cut out and formed linearly and continuously from the one end side to the other end side of the valve body 3 at the circumferential direction end of the third opening portion M3 that is in the vicinity of the boundary part between the third valve opening area O3 and the third valve closing area C3.

Here, in the first to the third seal-sliding parts D1 to D3 and the non-seal-sliding part D4, as shown in FIG. 11 (a), since the third seal-sliding part D3 is set in a circumferential direction range exceeding 180 degrees, as to the molding of the valve body 3, a forming mold is divided into three to avoid a so-called undercut. Specifically, as shown in FIG. 11 (a) and FIG. 11 (b), a first area A1 is formed by a first mold, a second area A2 is formed by a second mold and a third area A3 is formed by a third mold.

Figure 12:
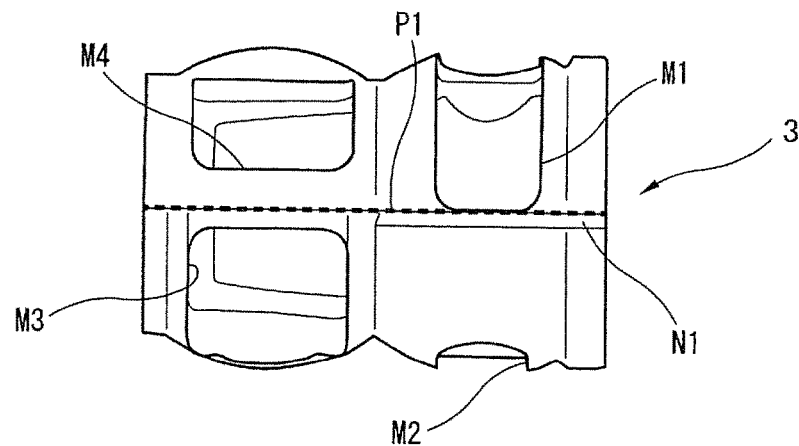
FIG. 12 (a) to FIG. 12 (c) are side views of the valve body, and FIG. 12 (a) is a drawing showing a first parting line, FIG. 12 (b) is a drawing showing a second parting line and FIG. 12 (c) is a drawing showing a third parting line.
Figure 12:
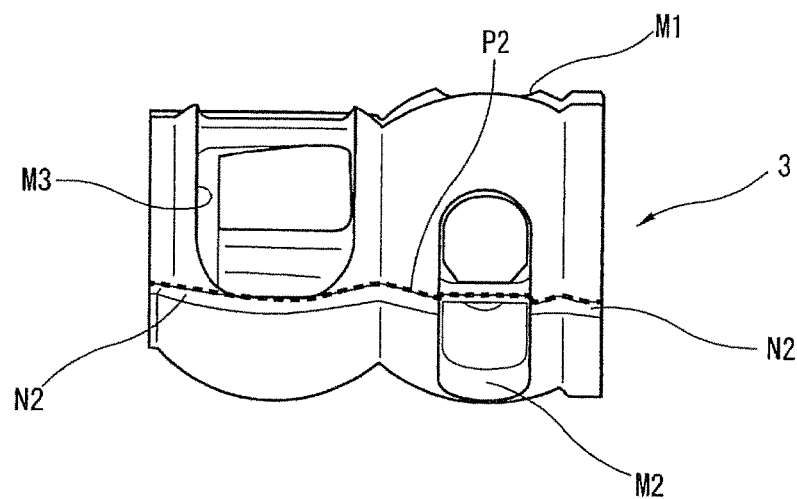
Figure 12:
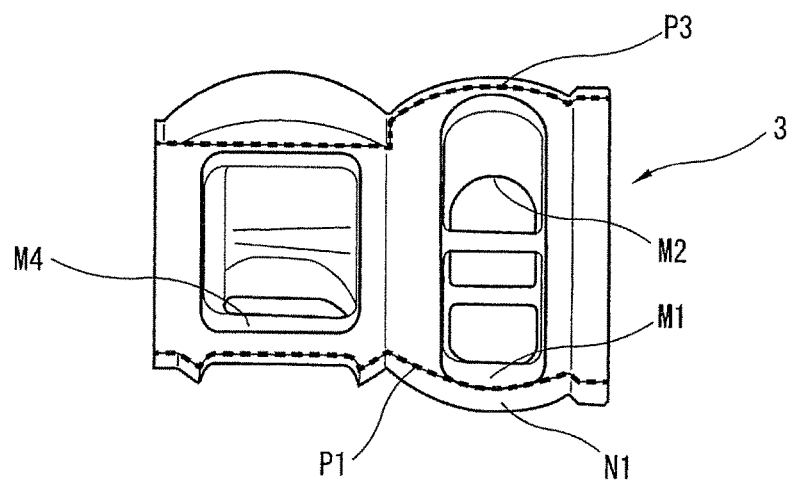

As shown in FIG. 12 (a), in the middle part in the width direction of the first level difference part N1, a first parting line P1 is formed at the joining part between the first mold and the second mold. As show in FIG. 12 (b), in the middle part in the width direction of the second level difference part N2, a second parting line P2 is formed at the joining part between the second mold and the third mold. Moreover, as shown in FIG. 12 (c), a third parting line P3 is formed at the joining part between the first mold and the third mold. In other words, the valve body 3 is formed by the first to the third molds so as to form the first to the third parting lines P1 to P3 at the respective circumferential positions of the valve body 3.

Figure 10:
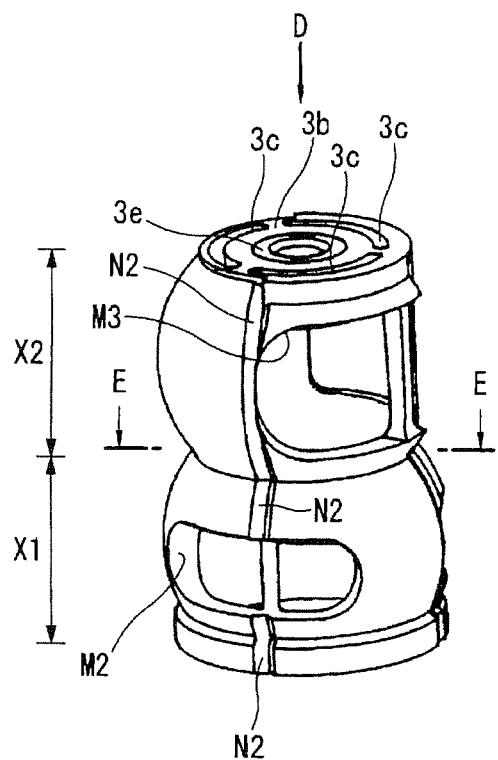
FIG. 10 (a) to FIG. 10 (d) are perspective views of a valve body shown in FIG. 3, viewed from different viewpoints.
Figure 10:
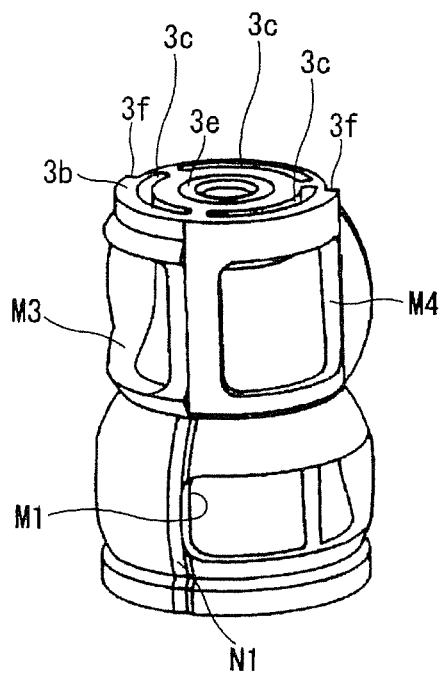
Figure 10:
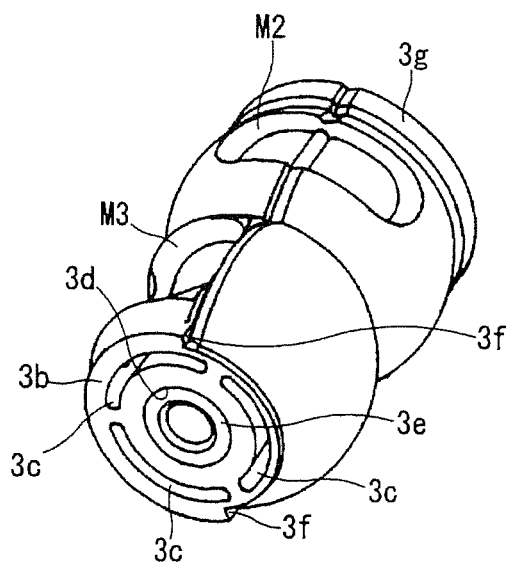
Figure 10:
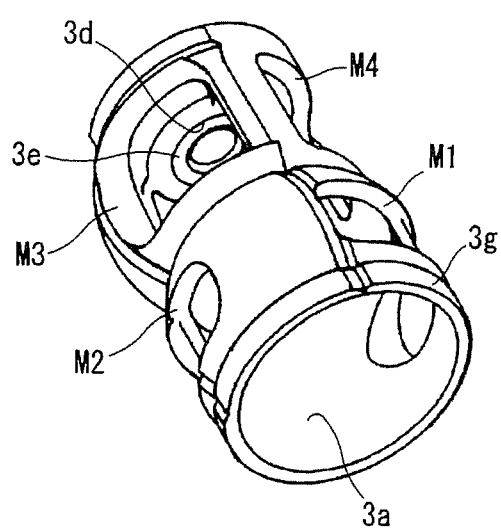

In addition, a pair of contact portions 3f, 3f for limiting the rotation of the valve body 3 is provided at both of the end portions of the third valve closing area C3 in the other end part of the valve body 3, based on the level difference shape of the valve body 3. As shown in FIG. 10 and FIG. 11, these contact portions 3f, 3f are provided to be capable of abutting on a rotation limitation portion 11e projecting from the other end side peripheral wall of the valve body accommodating part 13. By butting on the rotation limitation portion 11e, the rotation range of the valve body 3 is limited within the predetermined angle range. These contact portions 3f, 3f are necessarily formed when forming the valve body 3. Thus, by using these contact portions 3f, 3f, there is no need to specially provide a stopper for the limitation of the rotation, and this leads to cost reduction, etc. of the flow rate control valve CV.

Figure 14:
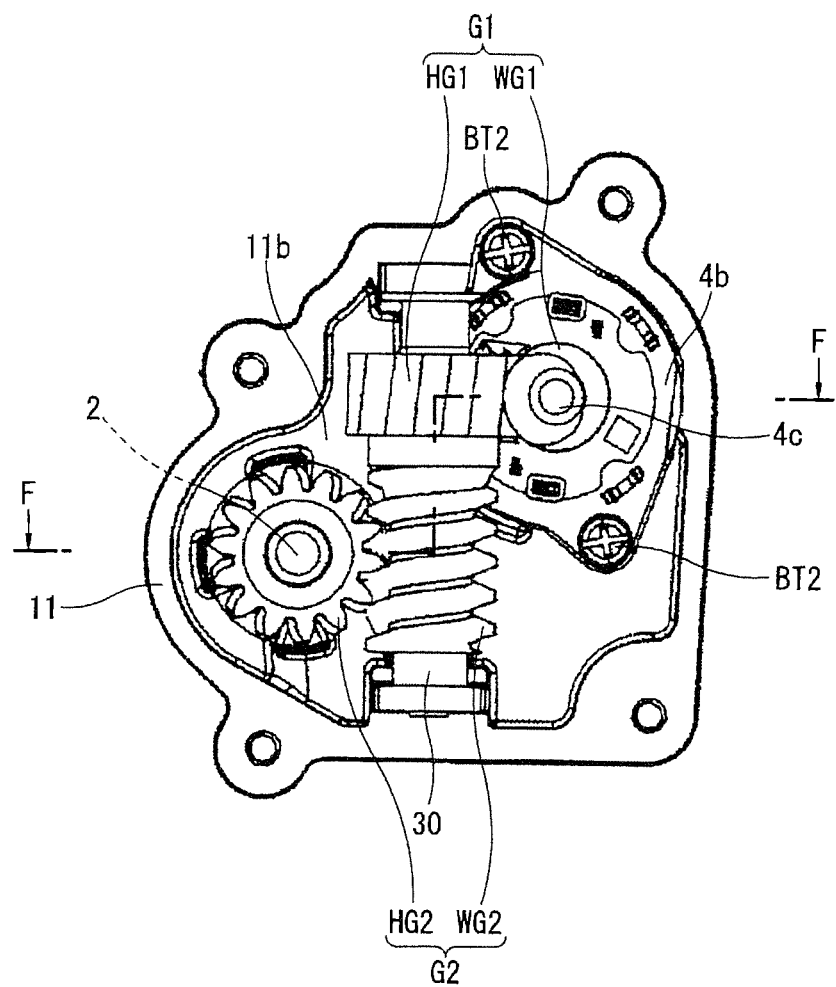
FIG. 14 is a plan view of the reduction gear mechanism shown in FIG. 13.

As shown in FIG. 14 and FIG. 15, the electric motor 4 is attached and fixed to the opening edge part of the motor accommodating part 14 by a plurality of bolts BT2 through a flange portion 4b provided at the base end part of a motor body 4a in a state in which the motor body 4a has been accommodated in the motor accommodating part 14 of the first housing 11, and the motor output shaft 4c extends to the inside of the reduction gear mechanism accommodating part 15 of the second housing 12 through the one end side opening of the motor accommodating part 14. In addition, the electric motor 4 is driven and controlled by an electronic controller (not shown in the drawings) mounted on a vehicle, and controls the rotation of the valve body 3 according to a vehicle operation condition, thereby realizing proper distribution of the cooling water to the radiator RD, etc.

Figure 13:
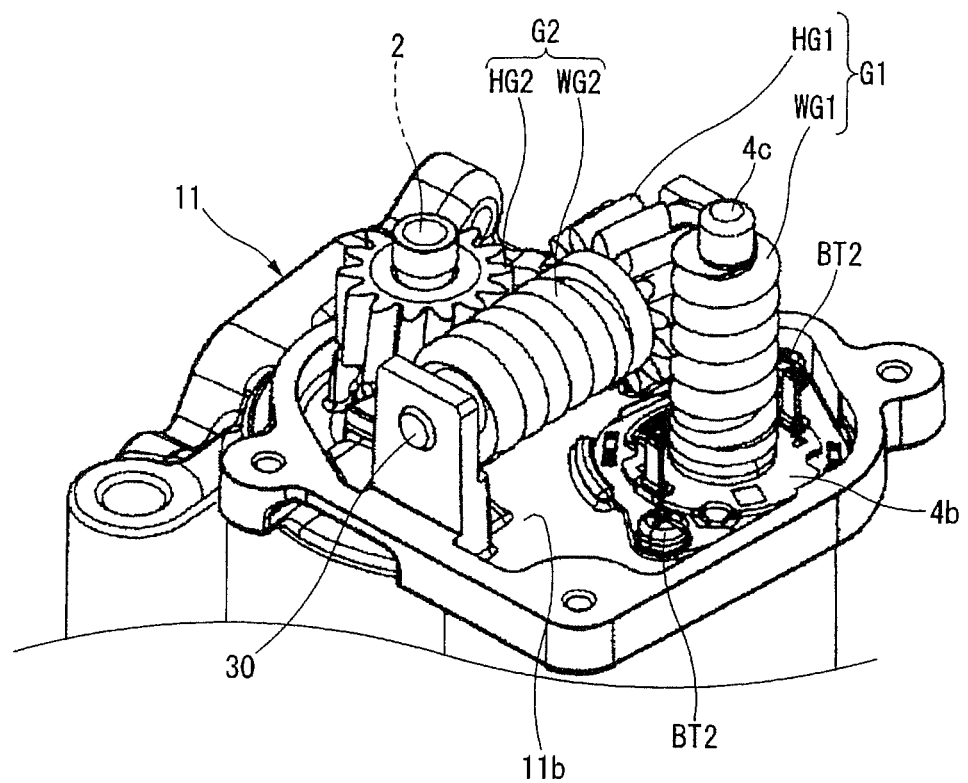
FIG. 13 is a perspective view of a reduction gear mechanism shown in FIG. 3.

The reduction gear mechanism 5 is a drive mechanism formed of two worm gears, and is configured of, as shown in FIG. 13 to FIG. 15, a first worm gear G1 for decelerating the rotation of the electric motor 4 in cooperation with the motor output shaft 4c, and of a second worm gear G2 which is connected to the first worm gear G1, and which further decelerates the rotation of the electric motor 4, which is transmitted through the first worm gear G1, and transmits it to the rotation shaft 2. The worm gear G2 is arranged substantially orthogonal to the first worm gear G1.

The first worm gear G1 is configured of a first screw gear WG1 which is integrally provided on the outer periphery of the motor output shaft 4c and which is rotated integrally with the motor output shaft 4c, and a first helical gear HG1 which is integrally provided on the outer periphery at one end side of a rotation shaft 30 provided orthogonal to the first screw gear WG1 provided substantially parallel to the motor rotation shaft 4c, and which decelerates the rotation of the first screw gear WG1 by meshing with the first screw gear WG1 and outputs it.

The second worm gear G2 is configured of a second screw gear WG2 which is integrally provided on the outer periphery at the other end side of the rotation shaft 30 and which is rotated integrally with the first helical gear HG1, and of a second helical gear HG2 which is fixed to the outer periphery at the other end side of the rotation shaft 2 arranged orthogonal to the second screw gear WG2 so as to be able to rotate integrally with the rotation shaft 2 and which decelerates the rotation of the second screw gear WG2 by meshing with the second screw gear WG2 and outputs it.

In the following, a specific operation state of the flow rate control valve CV will be explained based on FIG. 16. For convenience of the explanation, to distinguish the relative relationship between the discharge ports E1 to E3 and the respective opening portions M1 to M3, in FIG. 16, the first to the third opening portions M1 to M3 of the valve body 3 are drawn by a broken line, the first to the third discharge ports E1 to E3 of the first housing 11 are shown by hatching, and a state in which the E1 to E3 communicate with M1 to M3 respectively is shown in black.

That is, the electric motor 4 is controlled by control current calculated based on the vehicle operating condition and outputted from an electronic controller which is not shown in the drawings, and the rotation position (phase) of the valve body 3 of the flow rate control valve CV is controlled so that the relative relationship between the discharge ports E1 to E3 and the respective opening portions M1 to M3 is in the following each state according to the vehicle operating condition.

In a first state shown in FIG. 16 (*a*), all of the first to third opening portions M1 to M3 are in non-communication states with respect to the discharge ports E1 to E3. With this, in the first state, the cooling water is not supplied to any of the heater heat exchanger HT, the oil cooler OC and the radiator RD.

Next to the first state, in a second state shown in FIG. 16 (*b*), only the first opening portion M1 is in a communication state, and the second and the third opening portions M2 and M3 are in the non-communication states. Therefore, in the second state, based on the communication states, the cooling water is supplied to only the heater heat exchanger HT from the first discharge port E1 through the first pipe L1. Further, based on the overlapping amount between the first discharge port E1 and the first opening portion M1, the supply rate (the supply amount) of the cooling water to the heater heat exchanger HT is changed.

Next to the second state, in a third state shown in FIG. 16 (*c*), only the third opening portion M3 is in the non-communication state. The first and the second opening portions M1 and M2 are in the communication states. Therefore, in the third state, based on these communication states, the cooling water is supplied to the heater heat exchanger HT and to the oil cooler OC from the first and the second discharge ports E1 and E2 through the first and the second pipes L1 and L2. Further, based on the overlapping amounts between the first discharge port E1 and the first opening portion M1 and between the second discharge port E2 and the second opening portion M2, the supply rates (the supply amounts) of the cooling water to the heater heat exchanger HT and to the oil cooler OC are changed.

Next to the third state, in a fourth state shown in FIG. 16 (*d*), all of the first to the third opening portions M1 to M3 are in the communication states with respect to the discharge ports E1 to E3 respectively. Therefore, in the fourth state, the cooling water is supplied to all of the heater heat exchanger HT, the oil cooler OC and the radiator RD. Further, based on the overlapping amounts between the first discharge port E1 and the first opening portion M1, between the second discharge port E2 and the second opening portion M2 and between the third discharge port E3 and the third opening portion M3, the supply rates (the supply amounts) of the cooling water to the heater heat exchanger HT, to the oil cooler OC and to the radiator RD are changed.

Figure 17:
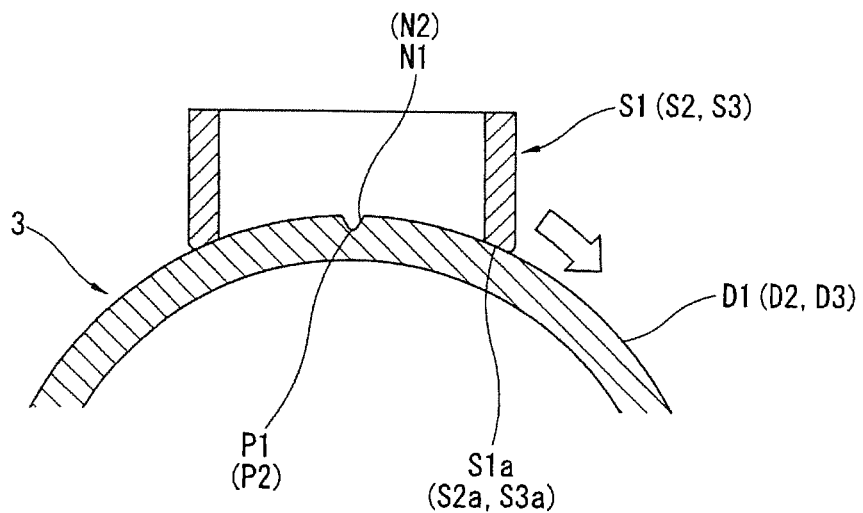
FIG. 17 (a) and FIG. 17 (b) are main part sectional views of the flow rate control valve in the first embodiment of the present invention.
Figure 17:
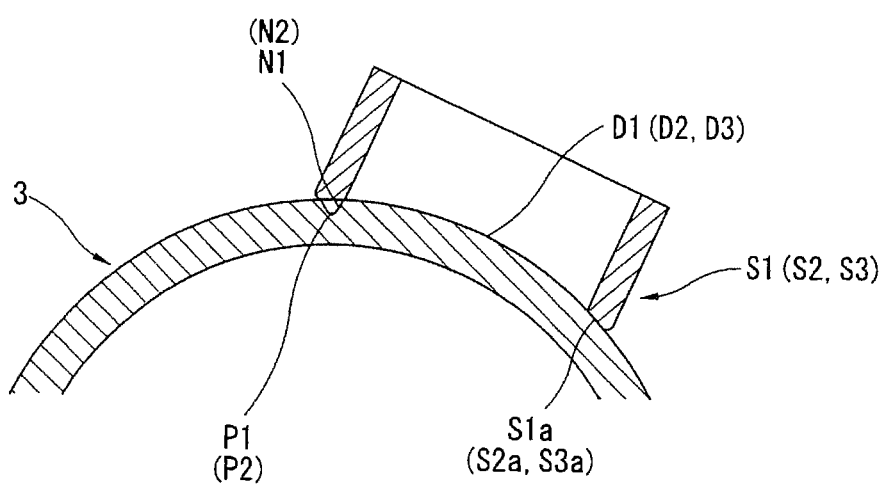

In the following, feature of an operation effect of the flow rate control valve CV according to the present embodiment will be explained based on FIG. 17.

As mentioned above, in the conventional flow rate control valve, since a convex parting line formed by molding projects at a seal area of a valve body, a seal member slides against the parting line, and there is a risk that the seal surface of the seal member is damaged by the parting line.

In contrast, in the flow rate control valve CV according to the present embodiment, the concave first and second level difference parts N1 and N2 recessed lower than the outer peripheral surfaces of the first to the third seal-sliding parts D1 to D3, which are seal-sliding contact surfaces, are provided, and the first and the second parting lines P1 and P2 are provided within the level difference parts N1 and N2 respectively, and the problem that the seal surface S1*a* slides against the parting line P1 and each of the seal surfaces S2*a* and S3*a* slides against the parting line P2 is suppressed when the seal surface S1*a* of the seal member S1 passes through the parting line P1 and each of the seal surfaces S2*a* and S3*a* of the respective seal members S2 and S3 passes through the parting line P2, and thereby it is possible to suppress damage to the seal surfaces S1a to S3a caused by sliding against the parting lines P1 and P2.

Moreover, since the first and the second level difference parts N1 and N2 are recessed radially inward as concave parts, it becomes possible to easily dispose the first and the second parting lines P1 and P2 within the first and the second level difference parts N1 and N2 respectively, and this leads to excellent manufacturing of the valve body 3.

On the other hand, as to the third parting line P3, in the first axial direction area X1, the third parting line P3 is positioned at the boundary between the first seal-sliding part D1 and the second seal-sliding part D2. With this, the issue that each of the seal surfaces S1a and S2a passes through (crosses) the third parting line P3 is avoided by the forward/reverse rotation of the valve body 3, and thereby it is possible to suppress damage to the seal surfaces S1a and S2a caused by sliding against the third parting line P3. On the other hand, in the second axial direction area X2, the third parting line P3 is positioned within the unused area UA, and the sliding of the third seal surface S3a against the third parting line P3 is suppressed, and thereby it is possible to suppress damage to the third seal surface S3a caused by sliding against the third parting line P3.

In addition, the first level difference part N1 is formed to be continuously connected to the seal-sliding part D1 and the second level difference part N2 is formed to be continuously connected to the seal-sliding parts D2 and D3 through smooth curved surfaces, and it is possible to suppress formation of a corner portion in the boundary part with each of the level difference parts N1 and N2. Therefore, it is possible to more effectively suppress damage to the seal surfaces S1a to S3a when the seal member S1 passes through the level difference part N1 and each of the seal members S2 and S3 passes through the level difference part N2.

In addition, the circumferential width of each of the first and the second level difference parts N1 and N2 is set smaller than that of each of the first to the third seal members S1 to S3. Consequently, as shown in FIG. 17, the problem that the seal member S1 drops into the first level difference part N1 and the seal members S2 and S3 drop into the second level difference part N2 is suppressed, and thereby it is possible to obtain smooth sliding contact of each of the seal members S1 to S3.

In addition, as to the first and the second level difference parts N1 and N2, most parts of them are provided at the circumferential ends of the first to the third opening portions M1 to M3, and thereby it becomes possible to integrally form each of the opening portions M1 to M3 without dividing each of them in the middle, and this leads to excellent manufacturing of the valve body 3 and cost reduction.

Moreover, the first and the second parting lines P1 and P2 are continuously formed from the one end side to the other end side of the rotation axis direction of the valve body 3, and this leads to excellent manufacturing of the valve body 3.

In addition, in the present embodiment, since it is configured so that the seal portion F of each of the seal surfaces S1a to S3a at the time of the valve closing is position inside with respect to the opening width of each of the first to the third opening portions M1 to M3 in the rotation axis direction of the valve body 3, even if the seal surfaces S1a to S3a are damaged by sliding against the opening edges of the opening portions M1 to M3 respectively, it is possible to maintain an excellent seal action by each of the seal surface S1a to S3a.

Moreover, in the accommodation and the support of the seal members S1 to S3 in the respective first to third discharge ports E1 to E3, since the pad portion 19 is provided at the inner side end of each of the discharge ports E1 to E3, it becomes possible to further reduce the gap between the inner peripheral surface of the first housing 11 and the outer peripheral surface of the valve body 3 by the pad portion 19, and thereby it is possible to suppress the projection amount of each of the seal members S1 to S3 from the respective inner side ends of the discharge ports E1 to E3. With this, the deformation of each of the seal members S1 to S3 is suppressed, and a stable seal action by each of the seal members S1 to S3 can be obtained. Moreover, it becomes possible to suppress the abrasion of each of the seal members S1 to S3 (each of the seal surfaces S1a to S3a) caused by the deformation, and consequently, the durability of each of the seal members S1 to S3 is also improved.

In addition, in the formation of the pad portion 19, the pad portion 19 is formed integrally with the first housing 11, and it is not necessary to provide the pad portion 19 separately, and this leads to excellent manufacturing of the flow rate control valve CV. Moreover, at this time, the pad portion 19 can be easily formed by casting, and the manufacturing of the flow rate control valve CV is further improved. Furthermore, in a case where the first housing 11 is molded with a resin material, the pad portion 19 is also easily formed by injection molding.

Second Embodiment

Figure 19:
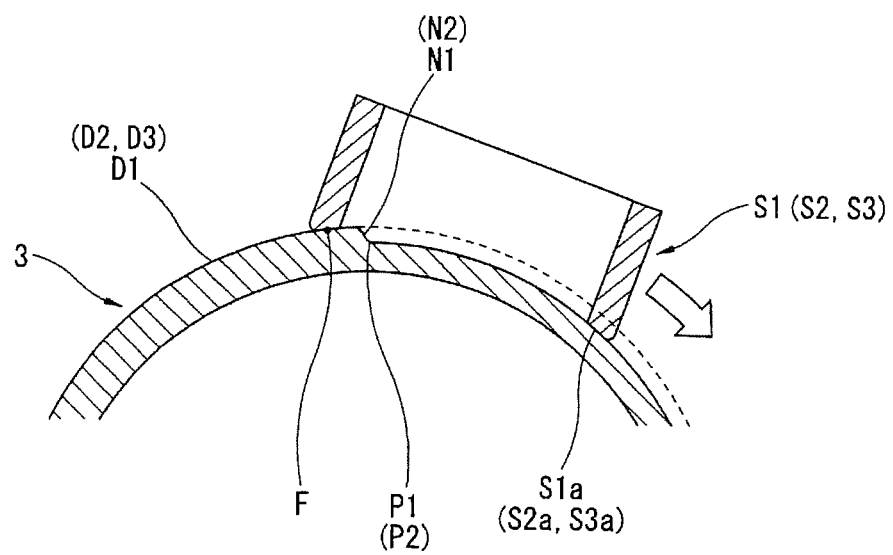
FIG. 19 (a) and FIG. 19 (b) are main part sectional views of the flow rate control valve in a second embodiment of the present invention.
Figure 19:
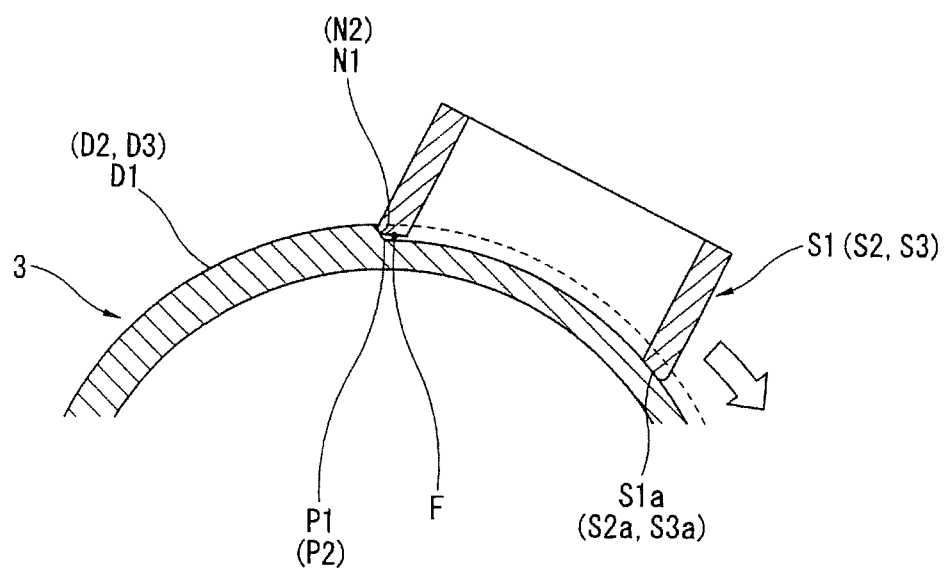

FIG. 19 shows a second embodiment of the flow rate control valve according to the present invention, in which the structure of each of the first and the second level difference parts N1 and N2 in the first embodiment has been changed. In addition, the configuration of the second embodiment is the same as that of the first embodiment, except the structure of each of the first and the second level difference parts N1 and N2 and the structure accompanying the after-mentioned formation of each of the level difference parts N1 and N2.

That is, in the present embodiment, the first and the second level different parts N1 and N2 are not formed in concave shapes (groove shapes) which are shown in the first embodiment, but are formed by step parts formed by making a difference in curvature at the front and behind, in the circumferential direction, of each of the level difference parts N1 and N2, in the circumferential direction of each of the seal-sliding portions S1 to D3. The first and the second parting lines P1 and P2 are disposed in the respective step parts.

In the above configuration of the present invention, the problem of the seal surface S1a of the seal member S1 sliding against the parting line P1 and each of the seal surfaces S2a and S3a of the respective seal members S2 and S3 sliding against the parting line P2 is also suppressed when the seal surface S1a passes through the parting line and each of the seal surfaces S2a and S3a passes through the parting line P2. Thereby, it is possible to suppress damage the seal surfaces S1a to S3a caused by sliding against the parting lines P1 and P2.

Moreover, in the case of the present embodiment, since the first and the second level difference parts N1 and N2 are formed by changing the curvature of the outer peripheral surface of the valve body 3, that is, by changing the curvature at the front and behind of each of the level difference parts N1 and N2 in the circumferential direction, it is not necessary to form each of the level difference parts N1 and N2 separately, and this leads to superior manufacturing of the valve body 3 and cost reduction.

In addition, since the first and the second level difference parts N1 and N2 according to the present embodiment are not formed in concave shapes like the level difference parts of the first embodiment, but are formed by simple step parts. Consequently, as shown in FIG. 19 (b), at least a part of the first seal surface S1a slides against the level difference part N1 and a part of each of the second and the third surfaces S2a and S3a slides against the second level difference part N2, at the time of the passage of the seal members S1 to S3. However, a slide contact portion in this case becomes the outer end edge of each of the seal surfaces S1a to S3a, and it is possible to avoid sliding against the seal portion F. Consequently, damage to the seal portion F caused by sliding against each of the level difference parts N1 and N2 can also be suppressed.

The present invention is not limited to the configuration according to each of the embodiments of the present invention. For example, regarding the size of each of the first to the third discharge ports E1 to E3, the number, arrangement (circumferential position) and shape of each of the first to the third opening portions M1 to M3, and the flow direction of the cooling water (from the introduction port 10 to each of the discharge ports E1 to E3), and also regarding the number of each of the level difference parts N1 to N2 (the division number of the mold for molding the valve body 3), the circumferential direction position (arrangement) of each of the parting lines P1 and P2, etc., can be freely changed and modified according to the specification of the flow rate control valve CV as long as the above-mentioned working effect can be obtained.

In particular, it is sufficient that in the valve body 3, each of the parting lines P1 and P2 is provided at a position where each of the seal members S1 to S3 does not slide against the parting lines P1 and P2, and not only a mode in which the level difference parts N1 and N2 are provided, and the parting lines P1 and P2 are respectively disposed in the level difference parts N1 and N2 like the embodiment mentioned above, but also a mode (corresponding to the third parting line P3) in which each of the parting lines P1 and P2 is disposed at an unused area obtained by, for example, increasing the diameter of the valve body 3 is included.

In addition, as the above-mentioned embodiment, a part of the parting line P1 is provided in the sliding contact range of the seal member S1 and a part of the parting line P2 is provided in the sliding contact range of each of the seal members S2 and S3, and the level difference part N1 is formed on the seal sliding part D1 and N2 is formed on the seal-sliding parts D2 and D3 in advance, and the parting lines P1 and P2 are provided within the level difference parts N1 and N2 respectively. Consequently, it becomes possible to reduce a non-seal-sliding part which becomes the unused area, and there is a benefit in that the diameter of the valve body 3 can be reduced.

On the other hand, by providing a part of each of the parting lines P1 and P2 to the non-sliding contact ranges of the seal members S1 to S3 by disposing each of the parting lines P1 and P2 on the non-seal sliding contact part which becomes the unused area, any machining is not necessary when forming each of the parting lines P1 and P2, and there is a merit that it leads to an excellent manufacturing of the valve body 3.

In addition, in each of the embodiments, although the present invention has been explained as an example in which the flow rate control valve CV is applied to the circular system of the cooling water, it is needless to say that the flow rate control valve CV can be applied to not only cooling water but various fluid such as lubricating oil.

As a flow rate control valve based on the embodiments explained above, for example, the following aspects can be considered.

That is, in one aspect of the flow rate control valve, the flow rate control valve includes a housing having; a main communication port for introduction or discharge of fluid, which is provided at a valve body accommodating part formed in a hollow shape; and a plurality of communication ports, each of which communicates with the valve accommodating part from a radial direction and introduces or discharges the fluid in the valve accommodating part; a valve body rotatably supported in the housing, and having a plurality of opening portions whose overlap states with the respective communication ports are changed according to a rotation position of the valve body; and seal members arranged between the housing and the valve body, the seal members sealing the space radially between the valve body and the housing by sliding against the outer peripheral surface of the valve body, wherein level difference parts lower than sliding contact surfaces of the valve body radially inward are provided on the sliding contact surfaces, against which the seal members slide, within ranges in which at least the communication ports and the respective opening portions overlap, in the circumferential range of the valve body.

In a preferable aspect of the flow rate control valve, the level difference parts are formed by concave parts that are recessed radially inward.

In another preferable aspect, the circumferential width of each of the concave parts is smaller than that of each of the seal members passing through the concave parts.

In another preferable aspect, the sliding contact surfaces of the valve body and the concave parts are continuously connected through smooth curved surfaces.

In another preferable aspect, each of the concave parts is provided at circumferential ends of the opening portions.

In another preferable aspect, each of the concave parts is provided continuously from one end side to the other end side in the rotation axis direction of the valve body.

In another preferable aspect, each of the level difference parts is formed by changing curvature of the outer periphery of the valve body.

In another preferable aspect, in a state in which the communication ports and the respective opening portions do not overlap with each other, the slide contact portion of each of the seal members becomes disposed inwardly with respect to the opening width of each of the opening portions in the rotation axis direction of the valve body.

In another preferable aspect, the plurality of the opening portions are provided at different circumferential positions of the outer periphery of the valve body, and at least a part of one of the opening portions overlaps with one of the opening portions in the rotation axis direction of the valve body.

In another preferable aspect, in any of the aspects of the flow rate control valve, pad portions serve as guide portions used for guiding of the seal members in a sliding manner are provided at respective inner side ends of the communication ports.

In another preferable aspect, each of the pad portions is formed integrally with the housing.

In another preferable aspect, the valve body is formed by injection molding of a synthetic resin.

In addition, from another viewpoint, a flow rate control valve, in one aspect, includes seal members arranged radially between a housing and a valve body rotatably supported inside the housing, the seal members sealing the space radially between the housing and the valve body by sliding against the outer peripheral surface of the valve body, wherein flow rate of fluid flowing out from the inner peripheral side of the valve body or flowing into the inner peripheral side of the valve body is changed by changing the overlap states between communication ports communicating the inside and the outside of the housing and respective opening portions communicating the inside and the outside of the valve body, wherein level difference parts lower than sliding contact surfaces of the valve body radially inward are provided on the sliding contact surfaces, against which the seal members slide, within ranges in which at least the communication ports and the respective opening portions overlap, in the circumferential range of the valve body.

In addition, a flow rate control valve, in another aspect, includes a housing having: a main communication port for introduction or discharge of fluid, which is provided at a valve body accommodating part formed in a hollow shape; and a plurality of communication ports, each of which communicates with the valve accommodating part from a radial direction and introduces or discharges the fluid in the valve accommodating part; a valve body rotatably supported in the housing, and having a plurality of opening portions whose overlap states with the respective communication ports are changed according to the rotation position of the valve body; and seal members arranged between the housing and the valve body, the seal members sealing the space radially between the valve body and the housing by sliding against the outer peripheral surface of the valve body, wherein parting lines are provided at positions not sliding against the seal members in the valve body.

In a preferable aspect of the flow rate control valve, at least a part of each of the parting lines is provided within a range in which the seal members slide against the outer peripheral surface of the valve body, in the circumferential range of the valve body.

In another preferable aspect, at least a part of each of the parting lines is provided within a range in which the seal members do not slide against the outer peripheral surface of the valve body, in the circumferential range of the valve body.

In a further preferable aspect, surfaces on which the seal members slide against the outer peripheral surface of the valve body, in the outer periphery of the valve body, are formed in spherical shapes, and a surface on which the seal members do not slide against the outer peripheral surface of the valve body, in the periphery of the valve body, is formed in a non-spherical shape.

The invention claimed is:

1. A flow rate control valve, comprising:
    a housing including
        a main communication port for introduction or discharge of fluid, which is provided at a valve body accommodating part formed in a hollow shape; and
        a plurality of communication ports, each communicating port configured to communicate with the valve body accommodating part from a radial direction and to introduce or discharge the fluid in the valve body accommodating part;
    a valve body rotatably supported in the housing, and having a plurality of opening portions that overlap with the respective communication ports based on a rotation position of the valve body;
    seal members arranged between the housing and the valve body in the radial direction with respect to a rotation axis of the valve body; and
    level difference parts provided between sliding contact surfaces of the valve body,
    wherein, on a plane perpendicular to the rotation axis, at least one of the sliding contact surfaces is formed more radially inward toward the rotation axis than at least one other adjacent sliding contact surface, wherein the seal members slide against the sliding contact surfaces when the valve body is rotated, and wherein the level difference parts at least partially overlap respective circumferential ends of the opening portions, and
    wherein each of the level difference parts is provided with a parting line within each level difference part.

2. The flow rate control valve according to claim 1, wherein the level difference parts include concave parts recessed radially inward relative to the parting line.

3. The flow rate control valve according to claim 2, wherein a circumferential width of each of the concave parts is smaller than that of each of the seal members passing through the concave parts.

4. The flow rate control valve according to claim 3, wherein the sliding contact surfaces of the valve body and the concave parts are connected via curved portions of the valve body.

5. The flow rate control valve according to claim 4, wherein each of the concave parts is provided continuously from one end side to the other end side along the rotation axis of the valve body.

6. The flow rate control valve according to claim 1, wherein each of the level difference parts is formed by changing a curvature of an outer periphery of the valve body.

7. The flow rate control valve according to claim 1, wherein in a state in which the communication ports and the respective opening portions do not overlap with each other, a slide contact portion of at least one of the seal members contacts at least one of the sliding contact surfaces, the slide contact portion being disposed closer to an interior portion of the at least one of the seal members than each of the opening portions along the rotation axis of the valve body.

8. The flow rate control valve according to claim 1, wherein the plurality of the opening portions are provided at different circumferential positions of an outer periphery of the valve body, and at least a part of one of the opening portions overlaps with another one of the opening portions along the rotation axis of the valve body.

9. The flow rate control valve according to claim 1, wherein guide portions configured to permit slideable guiding of the seal members are provided at respective inner side ends of the communication ports.

10. The flow rate control valve according to claim 9, wherein each of the guide portions is formed integrally with the housing.

11. The flow rate control valve according to claim 1, wherein the valve body is formed by injection molding of a synthetic resin.

12. A flow rate control valve, comprising:
    a housing including:
        a main communication port for introduction or discharge of fluid, which is provided at a valve body accommodating part formed in a hollow shape; and
        a plurality of communication ports, each of which communicates with the valve body accommodating part from a radial direction and is configured to introduce or discharge the fluid in the valve body accommodating part;

a valve body rotatably supported in the housing, and having a plurality of opening portions whose overlap states with the respective communication ports are changed according to a rotation position of the valve body;

seal members arranged between the housing and an outer peripheral surface of the valve body in a radial direction with respect to a rotation axis of the valve body; and parting lines provided on the outer peripheral surface of the valve body, wherein at least one of the parting lines is provided on a portion of the outer peripheral surface of the valve body that does not face the seal members at any point within a full rotation range of the valve body during operation.

13. The flow rate control valve according to claim 12, wherein surfaces on which the seal members slide against the outer peripheral surface of the valve body, in an outer periphery of the valve body, are formed in spherical shapes, and a surface on which the seal members do not slide against the outer peripheral surface of the valve body, in the periphery of the valve body, is formed in a non-spherical shape.

14. The flow rate control valve according to claim 13, further comprising:

level difference parts formed more radially inward than at least one of the surfaces on which the seal members slide against the outer peripheral surface of the valve body, wherein the part of at least one of the parting lines is provided at a transition region between the level difference parts and the at least one of the surfaces on which the seal members slide against the outer peripheral surface of the valve body.

* * * * *